(12) United States Patent
Zhou et al.

(10) Patent No.: US 10,470,046 B2
(45) Date of Patent: Nov. 5, 2019

(54) SIGNAL TRANSMISSION APPARATUS AND METHOD, AND WIRELESS ACCESS NODE

(71) Applicant: Huawei Technologies Co., Ltd., Shenzhen, Guangdong (CN)

(72) Inventors: Guohua Zhou, Shanghai (CN); Zongjie Wang, Shanghai (CN); Jiyu Ye, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 217 days.

(21) Appl. No.: 15/602,462

(22) Filed: May 23, 2017

(65) Prior Publication Data

US 2017/0257772 A1 Sep. 7, 2017

Related U.S. Application Data

(63) Continuation of application No. PCT/CN2014/092053, filed on Nov. 24, 2014.

(51) Int. Cl.
*H04W 16/10* (2009.01)
*H04L 5/00* (2006.01)
(Continued)

(52) U.S. Cl.
CPC .......... *H04W 16/10* (2013.01); *H04B 7/2621* (2013.01); *H04L 5/001* (2013.01); *H04W 16/14* (2013.01); *H04L 5/0048* (2013.01)

(58) Field of Classification Search
CPC .. H04W 72/042; H04W 56/001; H04L 5/0048
(Continued)

(56) References Cited

U.S. PATENT DOCUMENTS

2010/0029262 A1 2/2010 Wang et al.
2011/0085457 A1 4/2011 Chen et al.
(Continued)

FOREIGN PATENT DOCUMENTS

CN 102224759 A 10/2011
CN 102246444 A 11/2011
(Continued)

OTHER PUBLICATIONS

Huawei, "Inter-RAT interference issue of spectrum reallocation solutions," R3-141850, 3GPP TSG-RAN3 Meeting #85, Dresden, Germany, Aug. 18-22, 2014, 5 pages.
(Continued)

*Primary Examiner* — Iqbal Zaidi
(74) *Attorney, Agent, or Firm* — Leydig, Voit & Mayer, Ltd.

(57) ABSTRACT

Embodiments of the present disclosure disclose a signal transmission apparatus and method, and a wireless access node, and relate to the field of communications technologies, so as to resolve a problem that a spectrum cannot be fully used. The method of the present disclosure includes: obtaining, by a wireless access node, configuration information for use to transmit a signal of a second carrier in coverage space of a first carrier, a spectrum occupied by the first carrier and a spectrum occupied by the second carrier overlap, and a subcarrier of the first carrier and a subcarrier of the second carrier are orthogonal; and transmitting, by the wireless access node, the signal of the second carrier according to the configuration information. The present disclosure is applicable to a scenario in which a signal of a carrier is transmitted in coverage space of another carrier.

20 Claims, 21 Drawing Sheets

(51) Int. Cl.
*H04W 16/14* (2009.01)
*H04B 7/26* (2006.01)

(58) Field of Classification Search
USPC .................................................. 370/252–339
See application file for complete search history.

(56) References Cited

U.S. PATENT DOCUMENTS

| | | |
|---|---|---|
| 2011/0194639 A1 | 8/2011 | Nakao et al. |
| 2011/0211646 A1 | 9/2011 | Mashino et al. |
| 2011/0243268 A1 | 10/2011 | Mashino et al. |
| 2012/0039268 A1 | 2/2012 | Hakkinen et al. |
| 2012/0213304 A1* | 8/2012 | Kim ................ H04L 5/0046 375/267 |
| 2013/0107855 A1 | 5/2013 | Takeda et al. |
| 2014/0112303 A1 | 4/2014 | Popovic et al. |
| 2015/0103715 A1* | 4/2015 | Chen ................ H04W 76/15 370/311 |
| 2015/0223240 A1 | 8/2015 | Choi et al. |
| 2016/0043843 A1* | 2/2016 | Liu ................ H04L 5/0048 370/329 |
| 2016/0353444 A1 | 12/2016 | Popovic et al. |

FOREIGN PATENT DOCUMENTS

| | | |
|---|---|---|
| CN | 102246581 A | 11/2011 |
| CN | 102388665 A | 3/2012 |
| JP | 2011244198 A | 12/2011 |
| JP | 2011530237 A | 12/2011 |
| JP | 2012523772 A | 10/2012 |
| JP | 2014509139 A | 4/2014 |
| WO | 2008/019529 A1 | 2/2008 |
| WO | 2010016221 A1 | 2/2010 |
| WO | 2010064438 A1 | 6/2010 |
| WO | 2010088970 A1 | 8/2010 |
| WO | 2010118382 A1 | 10/2010 |

OTHER PUBLICATIONS

Hiroyuki Seki et al.,"Small Cell Design for LTE/LTE-Advanced Heterogeneous Networks." The Institute of Electronics, Information and Communication Engineers, IEICE Technical Report, IN2013-15,RCS2013-25(2013-5), May 16-17, 2013, 8 pages.

Motorola; "Downlink Control Protection in LTE TDD"; 3GPP TSG-RAN WG1 Meeting #59; R1-094841; Nov. 9-13, 2009; 5 pages.

* cited by examiner

SIGNAL TRANSMISSION APPARATUS AND METHOD, AND WIRELESS ACCESS NODE

CROSS-REFERENCE TO RELATED APPLICATIONS

This application is a continuation of International Application No. PCT/CN2014/092053, filed on Nov. 24, 2014, the disclosure of which is hereby incorporated by reference in its entirety.

TECHNICAL FIELD

The present disclosure relates to the field of communications technologies, and in particular, to a signal transmission apparatus and method, and a wireless access node.

BACKGROUND

Generally, multiple carriers are configured on a spectrum, so as to fully use a spectrum resource. As shown in FIG. 1a, multiple carriers are sequentially configured on a spectrum. A. However, when a total bandwidth required by the multiple carriers is greater than a bandwidth of the spectrum, such a quantity of carriers cannot be configured on the spectrum. As shown in FIG. 1b, a total bandwidth required by carriers 1, 2 and 3 exceeds a bandwidth of a spectrum B. To resolve this problem, the quantity of the carriers is usually reduced, so that a total bandwidth required by a reduced quantity of multiple carriers is not greater than the fixed bandwidth of the spectrum. As shown in FIG. 1c, the carrier 3 is no longer configured on the spectrum B. However, in this manner, a part of the frequency band is not used, so that the spectrum B cannot be fully used, thereby causing spectrum resource waste.

SUMMARY

Embodiments of the present disclosure disclose a signal transmission apparatus and method, and a wireless access node, to resolve a problem that a spectrum cannot be fully used.

To achieve the foregoing objective, the following technical solutions are used in the embodiments of the present disclosure.

According to a first aspect, an embodiment of the present disclosure provides a signal transmission apparatus, including:

an obtaining module, configured to obtain configuration information, where the configuration information is used to transmit a signal of a second carrier in coverage space of a first carrier, a spectrum occupied by the first carrier and a spectrum occupied by the second carrier overlap, and a subcarrier of the first carrier and a subcarrier of the second carrier are orthogonal; and a transmission module, configured to transmit the signal of the second carrier according to the configuration information.

With reference to the first aspect, in a first possible implementation manner, that a spectrum occupied by the first carrier and a spectrum occupied by the second carrier overlap includes:

the spectrum occupied by the first carrier and the spectrum occupied by the second carrier being partially overlapping, completely overlapping, or overlapping in an embedded manner.

With reference to the first aspect or the first possible implementation manner of the first aspect, in a second possible implementation manner, the first carrier and the second carrier belong to a same communications standard or different communications standards.

With reference to the first aspect, the first or the second possible implementation manner of the first aspect, in a third possible implementation manner, the first carrier and the second carrier are two independent cells; or the first carrier is a primary carrier, and the second carrier is a secondary carrier corresponding to the first carrier.

With reference to any one of the first aspect, or the first to the third possible implementation manners of the first aspect, in a fourth possible implementation manner, the signal of the second carrier carries a fundamental channel of the second carrier, time division multiplexing or frequency division multiplexing is performed, on an overlapping spectrum, between the fundamental channel of the second carrier and a fundamental channel of the first carrier, and the time division multiplexing or the frequency division multiplexing is corresponding to the first carrier or the second carrier in a time unit or a frequency unit; and both the fundamental channel of the second carrier and the fundamental channel of the first carrier include at least one of a common channel, a common control channel, a dedicated control channel, a shared channel, and a random access channel.

With reference to any one of the first aspect, or the first to the third possible implementation manners of the first aspect, in a fifth possible implementation manner, when frequency division multiplexing or time division multiplexing cannot be performed, on an overlapping spectrum, between a fundamental channel of the first carrier and a fundamental channel of the second carrier, subframe start moments of the first carrier and the second carrier are offset for a specific time unit, so as to overlap a first fundamental channel of the first carrier and a second fundamental channel of the second carrier, where a transmit power of the second fundamental channel of the second carrier on the overlapping spectrum is reduced to be less than a preset threshold or to be 0, or a transmit power of the first fundamental channel of the first carrier on the overlapping spectrum is reduced to be less than a preset threshold or to be 0; both the fundamental channel of the second carrier and the fundamental channel of the first carrier include at least one of a common channel, a common control channel, a dedicated control channel, a shared channel, and a random access channel; and the first fundamental channel of the first carrier is one of fundamental channels of the first carrier, the second fundamental channel of the second carrier is one of fundamental channels of the second carrier, and the first fundamental channel and the second fundamental channel are channels of different types.

With reference to the first aspect, in a sixth possible implementation manner, that a spectrum occupied by the first carrier and a spectrum occupied by the second carrier overlap includes:

a guard band of the spectrum occupied by the first carrier and a guard band of the spectrum occupied by the second carrier being overlapping; or a guard band of the spectrum occupied by the first carrier and a fundamental channel of the second carrier being overlapping; or a guard band of the spectrum occupied by the second carrier and a fundamental channel of the first carrier being overlapping.

With reference to the fifth possible implementation manner of the first aspect, in a seventh possible implementation manner, when the second fundamental channel of the second carrier is a common pilot channel, the apparatus further includes:
  a sending module, configured to send a demodulation reference signal by using the second carrier on a non-overlapping spectrum between the second carrier and the first carrier, where the demodulation reference signal is used for data demodulation of the non-overlapping spectrum of the second carrier.

With reference to the fifth possible implementation manner of the first aspect, in an eighth possible implementation manner, when the fundamental channel of the first carrier and the fundamental channel of the second carrier are physical downlink control channels, the apparatus further includes:
  a first scheduling module, configured to send, on a physical downlink control channel of the first carrier, downlink control information of a physical downlink control channel of the second carrier by using a cross-carrier scheduling technology; or send, on a physical downlink control channel of the second carrier, downlink control information of a physical downlink control channel of the first carrier.

With reference to the first aspect, in a ninth possible implementation manner, the apparatus further includes:
  a second scheduling module, configured to transmit, on a physical downlink control channel of a third carrier, downlink control information of the first carrier or the second carrier by using a cross-carrier scheduling technology, where
  the third carrier and the first carrier do not overlap, and the third carrier and the second carrier do not overlap; and the third carrier is a primary carrier, and both the first carrier and the second carrier are secondary carriers corresponding to the third carrier; or the third carrier is a primary carrier, the first carrier is a primary carrier, and the second carrier is a secondary carrier corresponding to the third carrier.

According to a second aspect, an embodiment of the present disclosure provides a wireless access node, and the wireless access node includes at least a network interface and a processor, where
  the network interface is configured to obtain configuration information, where the configuration information is used by the wireless access node to transmit a signal of a second carrier in coverage space of a first carrier, a spectrum occupied by the first carrier and a spectrum occupied by the second carrier overlap, and a subcarrier of the first carrier and a subcarrier of the second carrier are orthogonal; and
  the processor is configured to transmit the signal of the second carrier according to the configuration information.

With reference to the second aspect, in a first possible implementation manner, that a spectrum occupied by the first carrier and a spectrum occupied by the second carrier overlap includes:
  the spectrum occupied by the first carrier and the spectrum occupied by the second carrier being partially overlapping, completely overlapping, or overlapping in an embedded manner.

With reference to the second aspect or the first possible implementation manner of the second aspect, in a second possible implementation manner, the first carrier and the second carrier belong to a same communications standard or different communications standards.

With reference to the second aspect, the first or the second possible implementation manner of the second aspect, in a third possible implementation manner, the first carrier and the second carrier are two independent cells; or
  the first carrier is a primary carrier, and the second carrier is a secondary carrier corresponding to the first carrier.

With reference to any one of the second aspect, or the first to the third possible implementation manners of the second aspect, in a fourth possible implementation manner, the signal of the second carrier carries a fundamental channel of the second carrier, time division multiplexing or frequency division multiplexing is performed, on an overlapping spectrum, between the fundamental channel of the second carrier and a fundamental channel of the first carrier, and the time division multiplexing or the frequency division multiplexing is corresponding to the first carrier or the second carrier in a time unit or a frequency unit; and both the fundamental channel of the second carrier and the fundamental channel of the first carrier include at least one of a common channel, a common control channel, a dedicated control channel, a shared channel, and a random access channel.

With reference to any one of the second aspect, or the first to the third possible implementation manners of the second aspect, in a fifth possible implementation manner, when frequency division multiplexing or time division multiplexing cannot be performed, on an overlapping spectrum, between a fundamental channel of the first carrier and a fundamental channel of the second carrier, subframe start moments of the first carrier and the second carrier are offset for a specific time unit, so as to overlap a first fundamental channel of the first carrier and a second fundamental channel of the second carrier, where a transmit power of the second fundamental channel of the second carrier on the overlapping spectrum is reduced to be less than a preset threshold or to be 0, or a transmit power of the first fundamental channel of the first carrier on the overlapping spectrum is reduced to be less than a preset threshold or to be 0; both the fundamental channel of the second carrier and the fundamental channel of the first carrier include at least one of a common channel, a common control channel, a dedicated control channel, a shared channel, and a random access channel; and the first fundamental channel of the first carrier is one of fundamental channels of the first carrier, the second fundamental channel of the second carrier is one of fundamental channels of the second carrier, and the first fundamental channel and the second fundamental channel are channels of different types.

With reference to the second aspect, in a sixth possible implementation manner, that a spectrum occupied by the first carrier and a spectrum occupied by the second carrier overlap includes:
  a guard band of the spectrum occupied by the first carrier and a guard band of the spectrum occupied by the second carrier being overlapping; or a guard band of the spectrum occupied by the first carrier and a fundamental channel of the second carrier being overlapping; or a guard band of the spectrum occupied by the second carrier and a fundamental channel of the first carrier being overlapping.

With reference to the fifth possible implementation manner of the second aspect, in a seventh possible implementation manner, when the second fundamental channel of the second carrier is a common pilot channel, the processor is configured to send a demodulation reference signal by using the second carrier on a non-overlapping spectrum between the second carrier and the first carrier, where the demodulation reference signal is used for data demodulation of the non-overlapping spectrum of the second carrier.

With reference to the fifth possible implementation manner of the second aspect, in an eighth possible implementation manner, when the fundamental channel of the first carrier and the fundamental channel of the second carrier are physical downlink control channels, the processor is configured to send, on a physical downlink control channel of the first carrier, downlink control information of a physical downlink control channel of the second carrier by using a cross-carrier scheduling technology; or send, on a physical downlink control channel of the second carrier, downlink control information of a physical downlink control channel of the first carrier.

With reference to the second aspect, in a ninth possible implementation manner, the processor is configured to transmit, on a physical downlink control channel of a third carrier, downlink control information of the first carrier or the second carrier by using a cross-carrier scheduling technology, where
 the third carrier and the first carrier do not overlap, and the third carrier and the second carrier do not overlap; and the third carrier is a primary carrier, and both the first carrier and the second carrier are secondary carriers corresponding to the third carrier; or the third carrier is a primary carrier, the first carrier is a primary carrier, and the second carrier is a secondary carrier corresponding to the third carrier.

According to a third aspect, an embodiment of the present disclosure provides a signal transmission method, including:
 obtaining, by a wireless access node, configuration information, where the configuration information is used by the wireless access node to transmit a signal of a second carrier in coverage space of a first carrier, a spectrum occupied by the first carrier and a spectrum occupied by the second carrier overlap, and a subcarrier of the first carrier and a subcarrier of the second carrier are orthogonal; and
 transmitting, by the wireless access node, the signal of the second carrier according to the configuration information.

With reference to the third aspect, in a first possible implementation manner, that a spectrum occupied by the first carrier and a spectrum occupied by the second carrier overlap includes:
 the spectrum occupied by the first carrier and the spectrum occupied by the second carrier being partially overlapping, completely overlapping, or overlapping in an embedded manner.

With reference to the third aspect or the first possible implementation manner of the third aspect, in a second possible implementation manner, the first carrier and the second carrier belong to a same communications standard or different communications standards.

With reference to the third aspect, the first or the second possible implementation manner of the third aspect, in a third possible implementation manner, the first carrier and the second carrier are two independent cells; or
 the first carrier is a primary carrier, and the second carrier is a secondary carrier corresponding to the first carrier.

With reference to any one of the third aspect, or the first to the third possible implementation manners of the third aspect, in a fourth possible implementation manner, the signal of the second carrier carries a fundamental channel of the second carrier, time division multiplexing or frequency division multiplexing is performed, on an overlapping spectrum, between the fundamental channel of the second carrier and a fundamental channel of the first carrier, and the time division multiplexing or the frequency division multiplexing is corresponding to the first carrier or the second carrier in a time unit or a frequency unit; and both the fundamental channel of the second carrier and the fundamental channel of the first carrier include at least one of a common channel, a common control channel, a dedicated control channel, a shared channel, and a random access channel.

With reference to any one of the third aspect, or the first to the third possible implementation manners of the third aspect, in a fifth possible implementation manner, when frequency division multiplexing or time division multiplexing cannot be performed, on an overlapping spectrum, between a fundamental channel of the first carrier and a fundamental channel of the second carrier, subframe start moments of the first carrier and the second carrier are offset for a specific time unit, so as to overlap a first fundamental channel of the first carrier and a second fundamental channel of the second carrier, where a transmit power of the second fundamental channel of the second carrier on the overlapping spectrum is reduced to be less than a preset threshold or to be 0, or a transmit power of the first fundamental channel of the first carrier on the overlapping spectrum is reduced to be less than a preset threshold or to be 0; both the fundamental channel of the second carrier and the fundamental channel of the first carrier include at least one of a common channel, a common control channel, a dedicated control channel, a shared channel, and a random access channel; and the first fundamental channel of the first carrier is one of fundamental channels of the first carrier, the second fundamental channel of the second carrier is one of fundamental channels of the second carrier, and the first fundamental channel and the second fundamental channel are channels of different types.

With reference to the third aspect, in a sixth possible implementation manner, that a spectrum occupied by the first carrier and a spectrum occupied by the second carrier overlap includes:
 a guard band of the spectrum occupied by the first carrier and a guard band of the spectrum occupied by the second carrier being overlapping; or a guard band of the spectrum occupied by the first carrier and a fundamental channel of the second carrier being overlapping; or a guard band of the spectrum occupied by the second carrier and a fundamental channel of the first carrier being overlapping.

With reference to the fifth possible implementation manner of the third aspect, in a seventh possible implementation manner, when the second fundamental channel of the second carrier is a common pilot channel, the method further includes:
 sending, by the wireless access node, a demodulation reference signal by using the second carrier on a non-overlapping spectrum between the second carrier and the first carrier, where the demodulation reference signal is used for data demodulation of the non-overlapping spectrum of the second carrier.

With reference to the fifth possible implementation manner of the third aspect, in an eighth possible implementation manner, when the fundamental channel of the first carrier and the fundamental channel of the second carrier are physical downlink control channels, the method further includes:
 sending, by the wireless access node, on a physical downlink control channel of the first carrier, downlink control information of a physical downlink control channel of the second carrier by using a cross-carrier scheduling technology; or sending, on a physical downlink control channel of the second carrier, downlink control information of a physical downlink control channel of the first carrier.

With reference to the third aspect, in a ninth possible implementation manner, the method further includes:

transmitting, by the wireless access node on a physical downlink control channel of a third carrier, downlink control information of the first carrier or the second carrier by using a cross-carrier scheduling technology, where the third carrier and the first carrier do not overlap, and the third carrier and the second carrier do not overlap; and the third carrier is a primary carrier, and both the first carrier and the second carrier are secondary carriers corresponding to the third carrier; or the third carrier is a primary carrier, the first carrier is a primary carrier, and the second carrier is a secondary carrier corresponding to the third carrier.

According to the signal transmission apparatus and method, and the wireless access node that are provided in the embodiments of the present disclosure, configuration information can be obtained, and a signal of a second carrier is transmitted according to the configuration information. The configuration information is used by a wireless access node to transmit the signal of the second carrier in coverage space of a first carrier. A spectrum occupied by the first carrier and a spectrum occupied by the second carrier overlap, and a subcarrier of the first carrier and a subcarrier of the second carrier are orthogonal. Compared with the prior art in which multiple carriers are sequentially configured on a spectrum in a non-overlapping manner, in the present disclosure, the signal of the second carrier is transmitted in the coverage space of the first carrier, the spectrum occupied by the first carrier and the spectrum occupied by the second carrier overlap, and the subcarrier of the first carrier and the subcarrier of the second carrier are orthogonal, thereby avoiding interference between the first carrier and the second carrier. Because spectrums occupied by the first carrier and the second carrier overlap, a total bandwidth of spectrums occupied by multiple carriers including the first carrier and the second carrier may be adjusted by adjusting a bandwidth of an overlapping spectrum between the first carrier and the second carrier, so that an appropriate quantity of carriers can be configured on limited spectrum resources, thereby eliminating an unused frequency band on a spectrum, fully using the spectrum, and improving spectrum resource utilization.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

The following describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

It should be noted that descriptions of "first", "second", and the like in the specification are used to distinguish between different carriers, modules, and the like, do not indicate a sequence, do not limit that "first" and "second" are different types either, and are not applicable only to scenarios including "first" and "second", "third", "fourth", and the like may further exist. "When" in the specification represents that a condition and a state are met, and includes meanings, such as "if", "after a condition is met", or "determining succeeds".

The technical solutions provided in the embodiments of the present disclosure may be applied in a scenario in which a total bandwidth of multiple carriers is greater than a bandwidth of a spectrum. A carrier in the embodiments of the present disclosure may be a carrier defined in various communications systems. According to a communications standard, the various communications systems include: a Long Term Evolution (LTE) system, a Global System for Mobile Communications (GSM), a Universal Mobile Telecommunications System (UMTS), a wireless local area network (WLAN) system that uses a Wireless Fidelity (WiFi) technology, and the like. A spectrum in the embodiments of the present disclosure may be a spectrum exclusive for communications system in a communications standard, or may be a spectrum shared by communications systems in different communications standards.

Figure 1A:
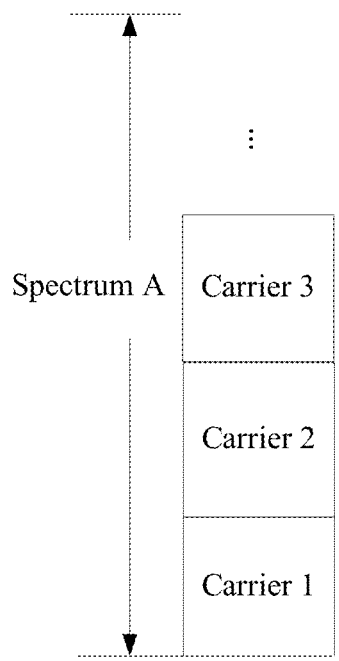
FIG. 1a, FIG. 1b, and FIG. 1c are illustrative schematic diagrams of carrier configuration according to the prior art.
Figure 1B:
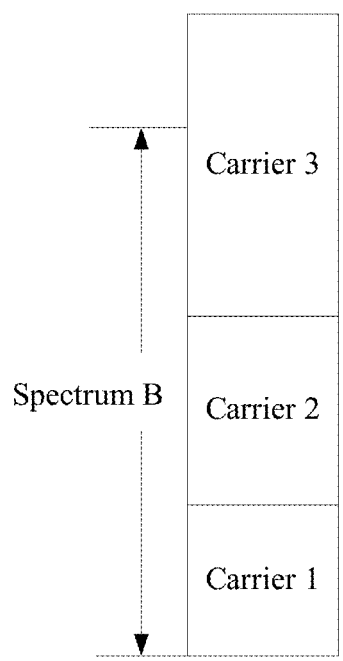
Figure 1C:
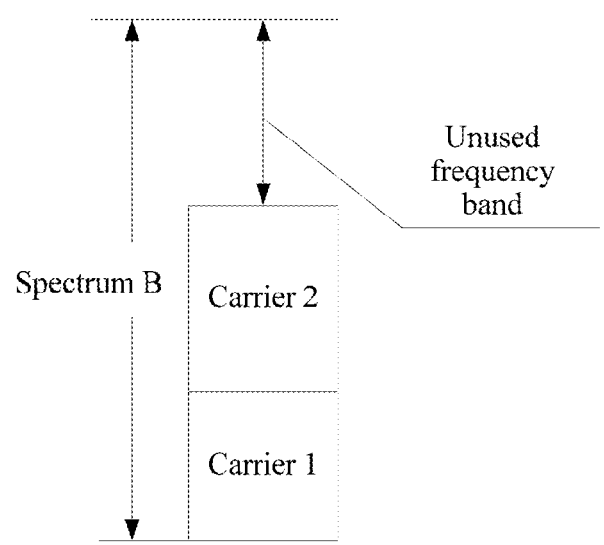
Figure 2:
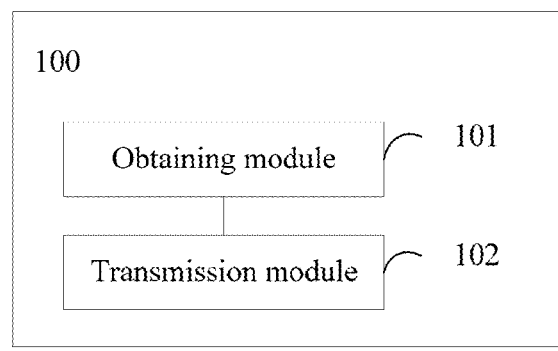
FIG. 2 is a schematic structural diagram of a signal transmission apparatus according to an embodiment of the present disclosure.

An embodiment of the present disclosure provides a signal transmission apparatus 100. As shown in FIG. 2, the signal transmission apparatus 100 includes an obtaining module 101 and a transmission module 102.

The obtaining module 101 is configured to obtain configuration information.

The configuration information is used to transmit a signal of a second carrier in coverage space of a first carrier.

A spectrum occupied by the first carrier and a spectrum occupied by the second carrier overlap, and a subcarrier of the first carrier and a subcarrier of the second carrier are orthogonal.

The transmission module 102 is configured to transmit the signal of the second carrier according to the configuration information.

The signal transmission apparatus provided in this embodiment of the present disclosure can obtain configuration information, and transmit a signal of a second carrier according to the configuration information. The configuration information is used by a wireless access node to transmit the signal of the second carrier in coverage space of a first carrier. A spectrum occupied by the first carrier and a spectrum occupied by the second carrier overlap, and a subcarrier of the first carrier and a subcarrier of the second carrier are orthogonal. Compared with the prior art in which multiple carriers are sequentially configured on a spectrum in a non-overlapping manner, in the present disclosure, the signal of the second carrier is transmitted in the coverage space of the first carrier, the spectrum occupied by the first carrier and the spectrum occupied by the second carrier overlap, and the subcarrier of the first carrier and the subcarrier of the second carrier are orthogonal, thereby avoiding interference between the first carrier and the second carrier. Because spectrums occupied by the first carrier and the second carrier overlap, a total bandwidth of spectrums occupied by multiple carriers including the first carrier and the second carrier may be adjusted by adjusting a bandwidth of an overlapping spectrum between the first carrier and the second carrier, so that an appropriate quantity of carriers can be configured on limited spectrum resources, thereby eliminating an unused frequency band on a spectrum, fully using the spectrum, and improving spectrum resource utilization.

Further, the spectrum occupied by the first carrier and the spectrum occupied by the second carrier are partially overlapping, completely overlapping, or overlapping in an embedded manner.

Further, a guard band of the spectrum occupied by the first carrier and a guard band of the spectrum occupied by the second carrier overlap; or a guard band of the spectrum occupied by the first carrier and a fundamental channel of the second carrier overlap; or a guard band of the spectrum occupied by the second carrier and a fundamental channel of the first carrier overlap.

The first carrier and the second carrier belong to a same communications standard or different communications standards.

Optionally, the first carrier and the second carrier are two independent cells; or the first carrier is a primary carrier, and the second carrier is a secondary carrier corresponding to the first carrier.

A communications standard to which the first carrier or the second carrier belongs is not limited, and an association relationship between the first carrier and the second carrier is not limited.

It should be noted that the signal of the second carrier carries the fundamental channel of the second carrier, time division multiplexing or frequency division multiplexing is performed, on an overlapping spectrum, between the fundamental channel of the second carrier and the fundamental channel of the first carrier, and the time division multiplexing or the frequency division multiplexing is corresponding to the first carrier or the second carrier in a time unit or a frequency unit; and both the fundamental channel of the second carrier and the fundamental channel of the first carrier include at least one of a common channel, a common control channel, a dedicated control channel, a shared channel, and a random access channel.

Interference between the fundamental channels of the two carriers is eliminated by performing, on the overlapping spectrum, time division multiplexing or frequency division multiplexing between the fundamental channel of the second carrier and the fundamental channel of the first carrier.

When the frequency division multiplexing or the time division multiplexing cannot be performed, on the overlapping spectrum, between the fundamental channel of the first carrier and the fundamental channel of the second carrier, subframe start moments of the first carrier and the second carrier are offset for a specific time unit, so as to overlap a first fundamental channel of the first carrier and a second fundamental channel of the second carrier. A transmit power of the second fundamental channel of the second carrier on the overlapping spectrum is reduced to be less than a preset threshold or to be 0, or a transmit power of the first fundamental channel of the first carrier on the overlapping spectrum is reduced to be less than a preset threshold or to be 0. The fundamental channel of the second carrier and the fundamental channel of the first carrier include at least one of a common signal channel, a common control channel, a dedicated control channel, a shared channel, and a random access channel. The first fundamental channel of the first carrier is one of fundamental channels of the first carrier, the second fundamental channel of the second carrier is one of fundamental channels of the second carrier, and the first fundamental channel and the second fundamental channel are channels of different types.

When time division multiplexing or frequency division multiplexing cannot be performed, on the overlapping spectrum, between the fundamental channel of the first carrier and the fundamental channel of the second carrier, mutual interference between the fundamental channels of the two carriers is eliminated by overlapping different types of fundamental channels of the two carriers and controlling a transmit power of a fundamental channel of one of the carriers on the overlapping spectrum to be reduced.

Figure 3:
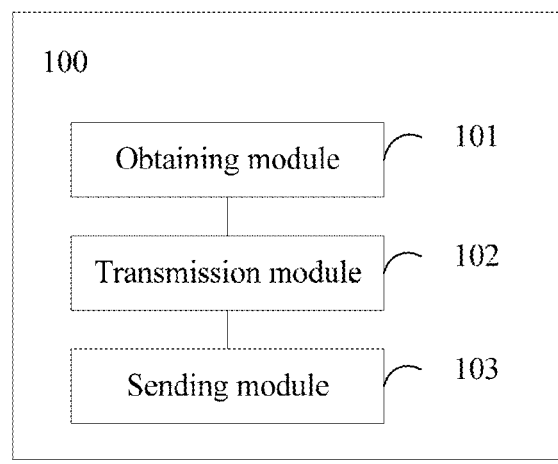
FIG. 3 is a schematic structural diagram of another signal transmission apparatus according to an embodiment of the present disclosure.

Optionally, when the second fundamental channel of the second carrier is a common pilot channel, as shown in FIG. 3, the apparatus 100 further includes:

a sending module 103, configured to send a demodulation reference signal by using the second carrier on a non-overlapping spectrum between the second carrier and the first carrier.

The demodulation reference signal is used for data demodulation of the non-overlapping spectrum of the second carrier.

The signal transmission apparatus provided in this embodiment of the present disclosure can obtain configuration information, and transmit a signal of a second carrier according to the configuration information. The configuration information is used by a wireless access node to transmit the signal of the second carrier in coverage space of a first carrier. A spectrum occupied by the first carrier and a spectrum occupied by the second carrier overlap, and a subcarrier of the first carrier and a subcarrier of the second carrier are orthogonal. Compared with the prior art in which multiple carriers are sequentially configured on a spectrum in a non-overlapping manner, in the present disclosure, the signal of the second carrier is transmitted in the coverage space of the first carrier, the spectrum occupied by the first carrier and the spectrum occupied by the second carrier overlap, and the subcarrier of the first carrier and the subcarrier of the second carrier are orthogonal, thereby avoiding interference between the first carrier and the second carrier. Because spectrums occupied by the first carrier and the second carrier overlap, a total bandwidth of spectrums occupied by multiple carriers including the first carrier and the second carrier may be adjusted by adjusting a bandwidth of an overlapping spectrum between the first carrier and the second carrier, so that an appropriate quantity of carriers can be configured on limited spectrum resources, thereby eliminating an unused frequency band on a spectrum, fully using the spectrum, and improving spectrum resource utilization. In addition, because power of one or more fundamental channels is reduced, demodulation performance of another fundamental channel significantly deteriorates. For a purpose of ensuring the demodulation performance of the other fundamental channel, a demodulation reference signal is sent by using the second carrier on a non-overlapping spectrum between the second carrier and the first carrier. Therefore, the demodulation performance of the other fundamental channel is improved.

Figure 4:
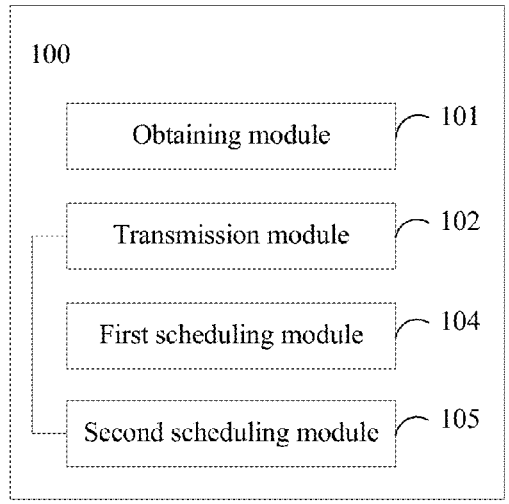
FIG. 4 is a schematic structural diagram of still another signal transmission apparatus according to an embodiment of the present disclosure.

Optionally, when the fundamental channel of the first carrier and the fundamental channel of the second carrier are physical downlink control channels, as shown in FIG. 4, the apparatus 100 may further include:

a first scheduling module 104, configured to send, on a physical downlink control channel of the first carrier, downlink control information of a physical downlink control channel of the second carrier by using a cross-carrier scheduling technology; or send, on a physical downlink control channel of the second carrier, downlink control information of a physical downlink control channel of the first carrier; and a second scheduling module 105, configured to transmit, on a physical downlink control channel of a third carrier, downlink control information of the first carrier or the second carrier by using a cross-carrier scheduling technology.

The third carrier and the first carrier do not overlap, and the third carrier and the second carrier do not overlap. The third carrier is a primary carrier, and both the first carrier and the second carrier are secondary carriers corresponding to the third carrier; or the third carrier is a primary carrier, the first carrier is a primary carrier, and the second carrier is a secondary carrier corresponding to the third carrier.

The signal transmission apparatus provided in this embodiment of the present disclosure can obtain configuration information, and transmit a signal of a second carrier according to the configuration information. The configuration information is used by a wireless access node to transmit the signal of the second carrier in coverage space of a first carrier. A spectrum occupied by the first carrier and a spectrum occupied by the second carrier overlap, and a subcarrier of the first carrier and a subcarrier of the second carrier are orthogonal. Compared with the prior art in which multiple carriers are sequentially configured on a spectrum in a non-overlapping manner, in the present disclosure, the signal of the second carrier is transmitted in the coverage space of the first carrier, the spectrum occupied by the first carrier and the spectrum occupied by the second carrier overlap, and the subcarrier of the first carrier and the subcarrier of the second carrier are orthogonal, thereby avoiding interference between the first carrier and the second carrier. Because spectrums occupied by the first carrier and the second carrier overlap, a total bandwidth of spectrums occupied by multiple carriers including the first carrier and the second carrier may be adjusted by adjusting a bandwidth of an overlapping spectrum between the first carrier and the second carrier, so that an appropriate quantity of carriers can be configured on limited spectrum resources, thereby eliminating an unused frequency band on a spectrum, fully using the spectrum, and improving spectrum resource utilization. In addition, downlink control information of a carrier can be sent on a downlink control channel of another carrier by using a cross-carrier scheduling technology, thereby avoiding a situation in which downlink control information cannot be sent and that is caused by a reduced transmit power of a downlink control channel of a carrier.

Figure 5:
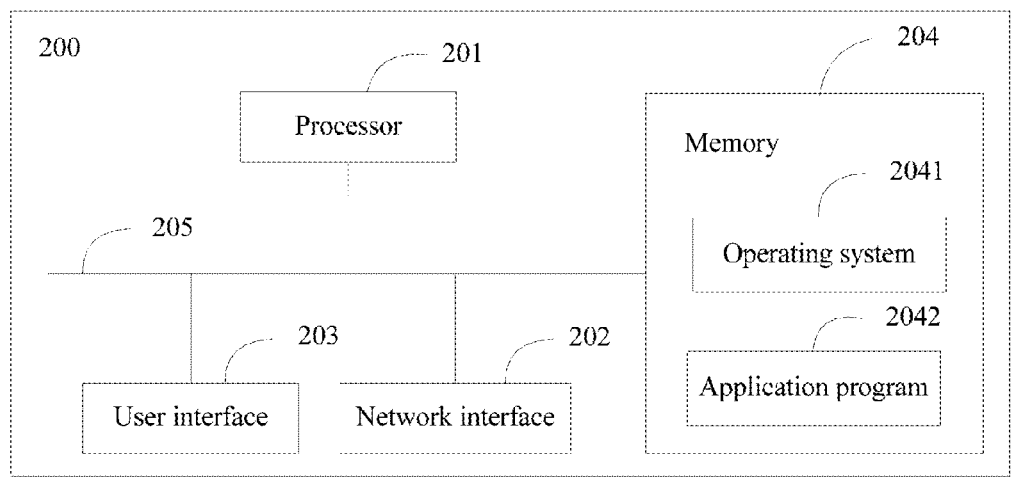
FIG. 5 is a schematic structural diagram of a wireless access node according to an embodiment of the present disclosure.

An embodiment of the present disclosure further includes a wireless access node 200. As shown in FIG. 5, the wireless access node 200 includes: at least one processor 201, for example, a CPU, at least one network interface 202 or another user interface 203, a memory 204, and at least one communications bus 205. The communications bus 205 is configured to implement connection and communication between the components. Optionally, the wireless access node 200 further includes a display, and an input device (for example, a mouse, a trackball (trackball), a touchpad, or a touchscreen). The memory 204 may include a high-speed RAM (Random-Access Memory, random access memory), and may further include a non-volatile memory (non-volatile memory), for example, at least one disk memory. Optionally, the memory 204 may include at least one storage apparatus that is far from the processor 201.

In some implementation manners, the memory 204 stores the following elements: an executable module or a data structure, or a subset of executable modules and data structures, or an extended set of executable modules and data structures:

an operating system 2041, including various system programs, which are used to implement various basic services and process hardware-based tasks; and an application program 2042, including various application programs, which are used to implement various application services.

The application program 2042 includes but is not limited to an obtaining module 101, a transmission module 102, a sending module 103, a first scheduling module 104, and a second scheduling module 105.

For specific implementation of the modules in the application program 2042, refer to corresponding modules in the embodiments shown in FIG. 2 to FIG. 4. Details are not described herein again.

Specifically, the network interface 202 is configured to obtain configuration information, where the configuration information is used by the wireless access node to transmit a signal of a second carrier in coverage space of a first carrier, a spectrum occupied by the first carrier and a spectrum occupied by the second carrier overlap, and a subcarrier of the first carrier and a subcarrier of the second carrier are orthogonal.

The processor 201 is configured to transmit the signal of the second carrier according to the configuration information.

Further, the spectrum occupied by the first carrier and the spectrum occupied by the second carrier are partially overlapping, completely overlapping, or overlapping in an embedded manner.

Further, the first carrier and the second carrier belong to a same communications standard or different communications standards. The first carrier and the second carrier are two independent cells; or the first carrier is a primary carrier, and the second carrier is a secondary carrier corresponding to the first carrier.

Further, the signal of the second carrier carries a fundamental channel of the second carrier, time division multiplexing or frequency division multiplexing is performed, on an overlapping spectrum, between the fundamental channel of the second carrier and a fundamental channel of the first carrier, and the time division multiplexing or the frequency division multiplexing is corresponding to the first carrier or the second carrier in a time unit or a frequency unit; and both the fundamental channel of the second carrier and the fundamental channel of the first carrier include at least one of a common channel, a common control channel, a dedicated control channel, a shared channel, and a random access channel.

Further, when frequency division multiplexing or time division multiplexing cannot be performed, on the overlapping spectrum, between a fundamental channel of the first carrier and the fundamental channel of the second carrier, subframe start moments of the first carrier and the second carrier are offset for a specific time unit, so as to overlap a first fundamental channel of the first carrier and a second fundamental channel of the second carrier. A transmit power of the second fundamental channel of the second carrier on the overlapping spectrum is reduced to be less than a preset threshold or to be 0, or a transmit power of the first fundamental channel of the first carrier on the overlapping spectrum is reduced to be less than a preset threshold or to be 0. Both the fundamental channel of the second carrier and the fundamental channel of the first carrier include at least one of a common channel, a common control channel, a dedicated control channel, a shared channel, and a random access channel. The first fundamental channel of the first carrier is one of fundamental channels of the first carrier, the second fundamental channel of the second carrier is one of fundamental channels of the second carrier, and the first fundamental channel and the second fundamental channel are channels of different types.

Further, a guard band of the spectrum occupied by the first carrier and a guard band of the spectrum occupied by the second carrier overlap; or a guard band of the spectrum occupied by the first carrier and a fundamental channel of the second carrier overlap; or a guard band of the spectrum occupied by the second carrier and a fundamental channel of the first carrier overlap.

Optionally, when the second fundamental channel of the second carrier is a common pilot channel, the processor is configured to send a demodulation reference signal by using the second carrier on a non-overlapping spectrum between the second carrier and the first carrier, where the demodulation reference signal is used for data demodulation of the non-overlapping spectrum of the second carrier.

Optionally, when the fundamental channel of the first carrier and the fundamental channel of the second carrier are physical downlink control channels, the processor is configured to send, on a physical downlink control channel of the first carrier, downlink control information of a physical downlink control channel of the second carrier by using a cross-carrier scheduling technology; or send, on a physical downlink control channel of the second carrier, downlink control information of a physical downlink control channel of the first carrier.

Optionally, the processor is configured to transmit, on a physical downlink control channel of a third carrier, downlink control information of the first carrier or the second carrier by using a cross-carrier scheduling technology.

The third carrier and the first carrier do not overlap, and the third carrier and the second carrier do not overlap. The third carrier is a primary carrier, and both the first carrier and the second carrier are secondary carriers corresponding to the third carrier; or the third carrier is a primary carrier, the first carrier is a primary carrier, and the second carrier is a secondary carrier corresponding to the third carrier.

The wireless access node provided in this embodiment of the present disclosure can obtain configuration information, and transmit a signal of a second carrier according to the configuration information. The configuration information is used by the wireless access node to transmit the signal of the second carrier in coverage space of a first carrier. A spectrum occupied by the first carrier and a spectrum occupied by the second carrier overlap, and a subcarrier of the first carrier and a subcarrier of the second carrier are orthogonal. Compared with the prior art in which multiple carriers are sequentially configured on a spectrum in a non-overlapping manner, in the present disclosure, the signal of the second carrier is transmitted in the coverage space of the first carrier, the spectrum occupied by the first carrier and the spectrum occupied by the second carrier overlap, and the subcarrier of the first carrier and the subcarrier of the second carrier are orthogonal, thereby avoiding interference between the first carrier and the second carrier. Because spectrums occupied by the first carrier and the second carrier overlap, a total bandwidth of spectrums occupied by multiple carriers including the first carrier and the second carrier may be adjusted by adjusting a bandwidth of an overlapping spectrum between the first carrier and the second carrier, so that an appropriate quantity of carriers can be configured on limited spectrum resources, thereby eliminating an unused frequency band on a spectrum, fully using the spectrum, and improving spectrum resource utilization. Interference between the fundamental channels of the two carriers is eliminated by performing, on an overlapping spectrum, time division multiplexing or frequency division multiplexing between a fundamental channel of the second carrier and a fundamental channel of the first carrier. When time division multiplexing or frequency division multiplexing cannot be performed, on the overlapping spectrum, between the fundamental channel of the first carrier and the fundamental channel of the second carrier, mutual interference between the fundamental channels of the two carriers is eliminated by overlapping different types of fundamental channels of the two carriers and controlling a transmit power of a fundamental channel of one of the carriers on the overlapping spectrum to be reduced. In addition, because power of one or more fundamental channels is reduced, demodulation performance of another fundamental channel significantly deteriorates. For a purpose of ensuring the demodulation performance of the other fundamental channel, a demodulation reference signal is sent by using the second carrier on a non-overlapping spectrum between the second carrier and the first carrier. Therefore, the demodulation performance of the other fundamental channel is improved. In addition, downlink control information of a carrier can be sent on a downlink control channel of another carrier by using a cross-carrier scheduling technology, thereby avoiding a situation in which downlink control information cannot be sent and that is caused by a reduced transmit power of a downlink control channel of a carrier.

The wireless access node in this embodiment of the present disclosure may be a base station or a base station controller in a cellular communications system, for example, an evolved node B (eNB) in an LTE system, or a node B (NodeB) or a radio network controller (RNC) in a UMTS, or may be a WLAN access point (AP) in a non-cellular communications system.

Figure 6:
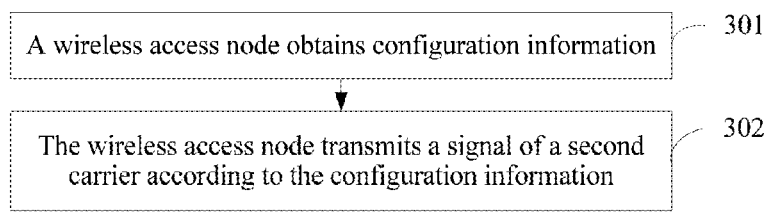
FIG. 6 is a flowchart of a signal transmission method according to an embodiment of the present disclosure.

An embodiment of the present disclosure provides a signal transmission method. As shown in FIG. 6, the signal transmission method includes the following steps.

301. A wireless access node obtains configuration information.

Figure 6A:
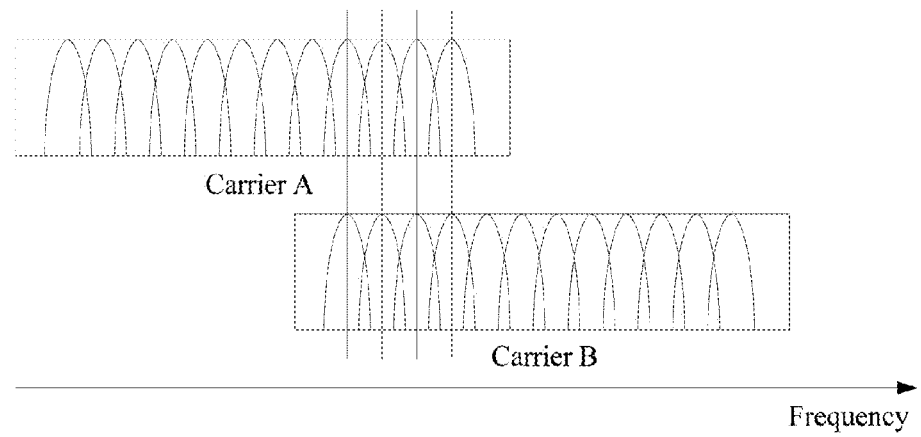
FIG. 6a is an illustrative schematic diagram of subcarriers of two carriers being orthogonal according to an embodiment of the present disclosure.

The configuration information is used by the wireless access node to transmit a signal of a second carrier in coverage space of a first carrier. The coverage space of the first carrier is a physical space, and a location of the coverage space is determined by various factors, such as a location of the wireless access node and an antenna opening angle. A spectrum occupied by the first carrier and a spectrum occupied by the second carrier overlap, and a subcarrier of the first carrier and a subcarrier of the second carrier are orthogonal. Therefore, there is no interference between the subcarrier of the first carrier and the subcarrier of the second carrier. As shown in FIG. 6a, on a carrier A and a carrier B, a subcarrier of the carrier A and a subcarrier of the carrier B are orthogonal.

It should be noted that the wireless access node may obtain the configuration information from another wireless access node in a network, for example, an OAM (Operation Administration and Maintenance) device. The wireless access node may further receive an input instruction that is input by local operation personnel, and obtain the configuration information from the input instruction.

302. The wireless access node transmits a signal of a second carrier according to the configuration information.

The wireless access node transmits the signal of the second carrier in the coverage space of the first carrier according to the configuration information. A signal of a carrier carries a fundamental channel of the carrier.

According to the signal transmission method provided in this embodiment of the present disclosure, configuration information can be obtained, and a signal of a second carrier is transmitted according to the configuration information. The configuration information is used by a wireless access node to transmit the signal of the second carrier in coverage space of a first carrier. A spectrum occupied by the first carrier and a spectrum occupied by the second carrier overlap, and a subcarrier of the first carrier and a subcarrier of the second carrier are orthogonal. Compared with the prior art in which multiple carriers are sequentially configured on a spectrum in a non-overlapping manner, in the present disclosure, the signal of the second carrier is transmitted in the coverage space of the first carrier, the spectrum occupied by the first carrier and the spectrum occupied by the second carrier overlap, and the subcarrier of the first carrier and the subcarrier of the second carrier are orthogonal, thereby avoiding interference between the first carrier and the second carrier. Because spectrums occupied by the first carrier and the second carrier overlap, a total bandwidth of spectrums occupied by multiple carriers including the first carrier and the second carrier may be adjusted by adjusting a bandwidth of an overlapping spectrum between the first carrier and the second carrier, so that an appropriate quantity of carriers can be configured on limited spectrum resources, thereby eliminating an unused frequency band on a spectrum, fully using the spectrum, and improving spectrum resource utilization.

Figure 6B:
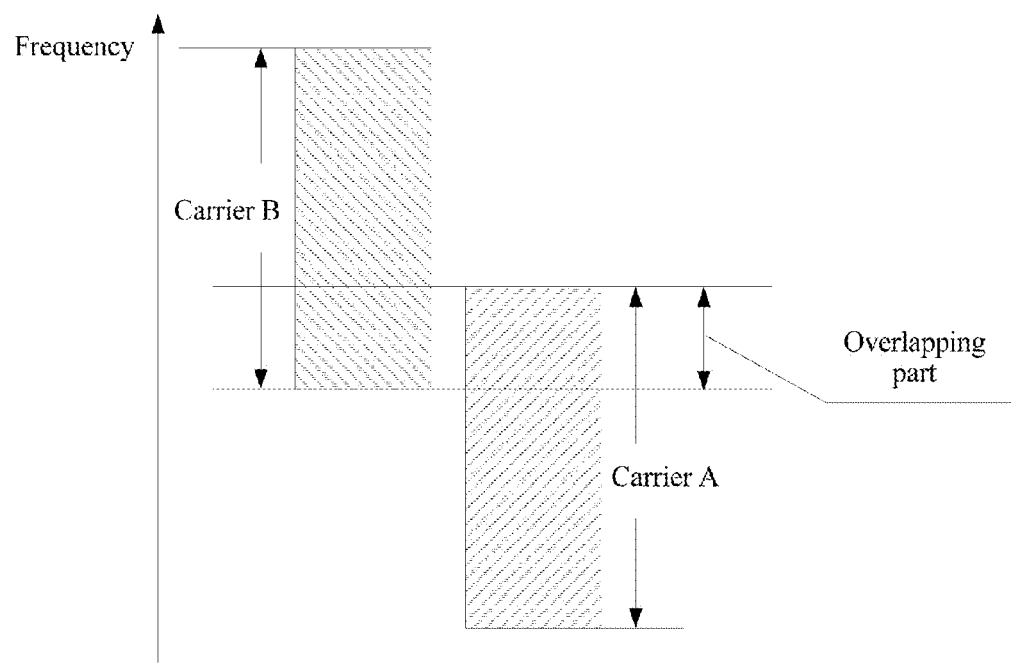
FIG. 6b, FIG. 6c, and FIG. 6d are illustrative schematic diagrams of examples in which two carriers overlap according to an embodiment of the present disclosure.
Figure 6C:
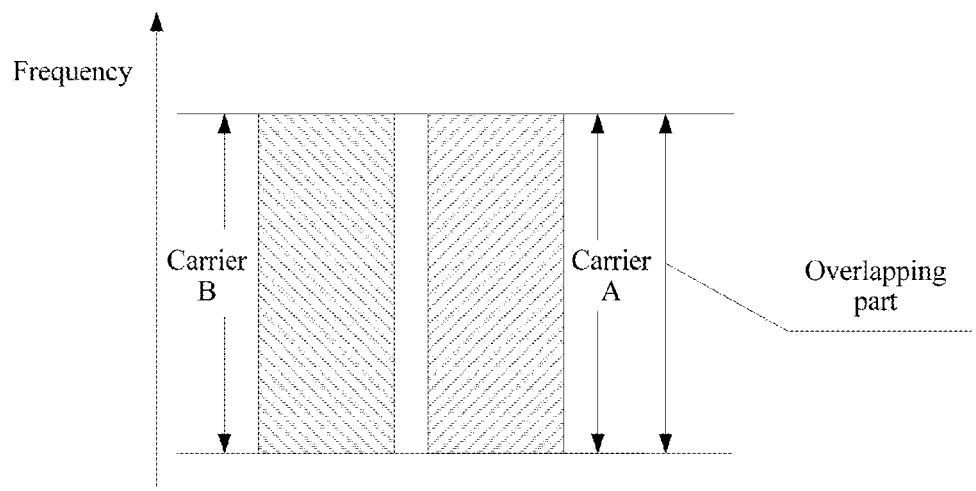
Figure 6D:
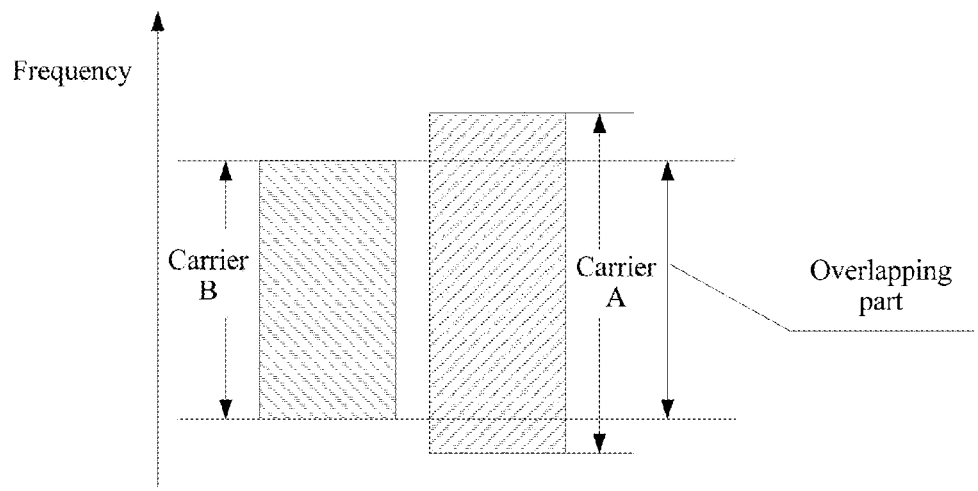

It should be further noted that the spectrum occupied by the first carrier and the spectrum occupied by the second carrier may be partially overlapping. For example, as shown in FIG. 6b, the first carrier is the carrier A, the second carrier is the carrier B, there is an overlapping part between a spectrum occupied by the carrier A and a spectrum occupied by the carrier B, and the spectrum occupied by the carrier A and the spectrum occupied by the carrier B are partially overlapping. The spectrum occupied by the first carrier and the spectrum occupied by the second carrier may be completely overlapping. For example, as shown in FIG. 6c, a bandwidth of a spectrum occupied by the carrier A is equal to a bandwidth of a spectrum occupied by the carrier B, and the spectrum occupied by the carrier A and the spectrum occupied by the carrier B are completely overlapping. Alternatively, the spectrum occupied by the first carrier and the spectrum occupied by the second carrier may be overlapping in an embedded manner. For example, as shown in FIG. 6d, a bandwidth of a spectrum occupied by the carrier A is greater than a bandwidth of a spectrum occupied by the carrier B, and the spectrum occupied by the carrier B overlaps the spectrum occupied by the carrier A in an embedded manner. Spectrums occupied by the two carriers are partially overlapping, completely overlapping, or overlapping in an embedded manner, so that a total bandwidth of spectrums occupied by the two carriers is reduced. In addition, a total bandwidth of spectrums occupied by multiple carriers including the two carriers is reduced, so that multiple carriers can be effectively configured on limited spectrums.

Figure 7A:
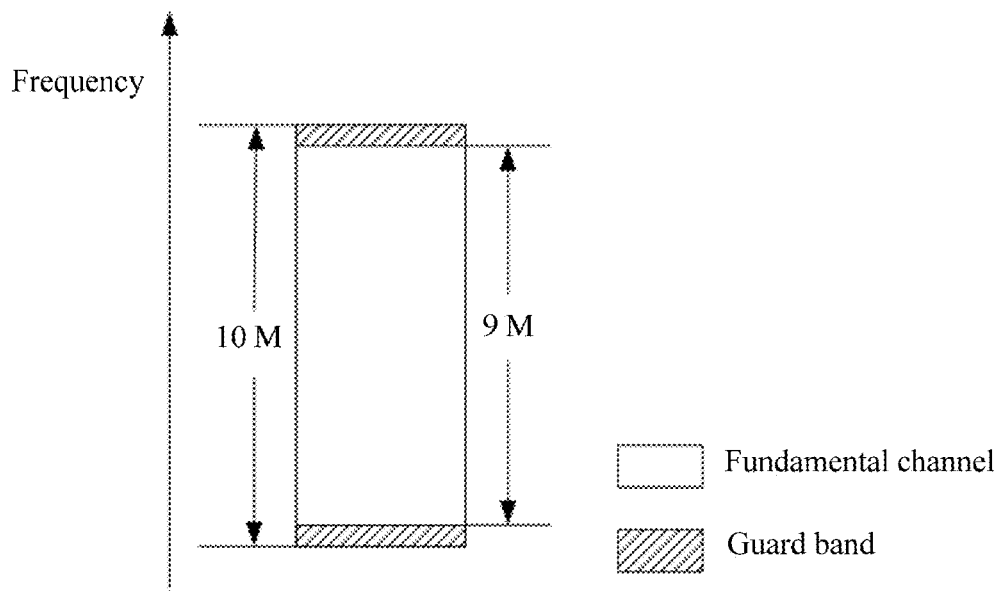
FIG. 7a is an illustrative schematic diagram of an example of a carrier with a guard band according to an embodiment of the present disclosure.
Figure 7B:
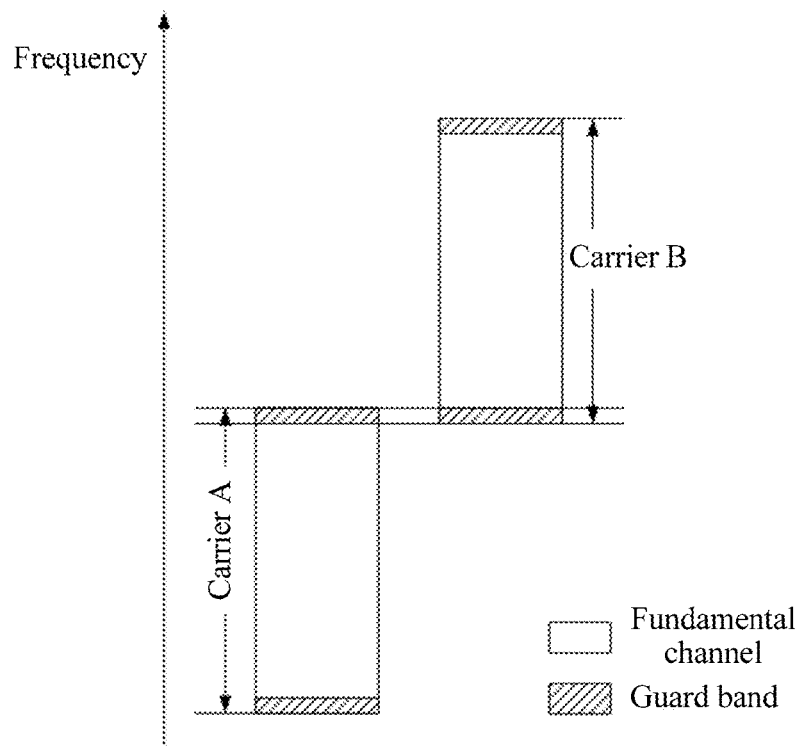
FIG. 7b and FIG. 7c are illustrative schematic diagrams of examples in which two carriers having a guard band overlap according to an embodiment of the present disclosure.
Figure 7C:
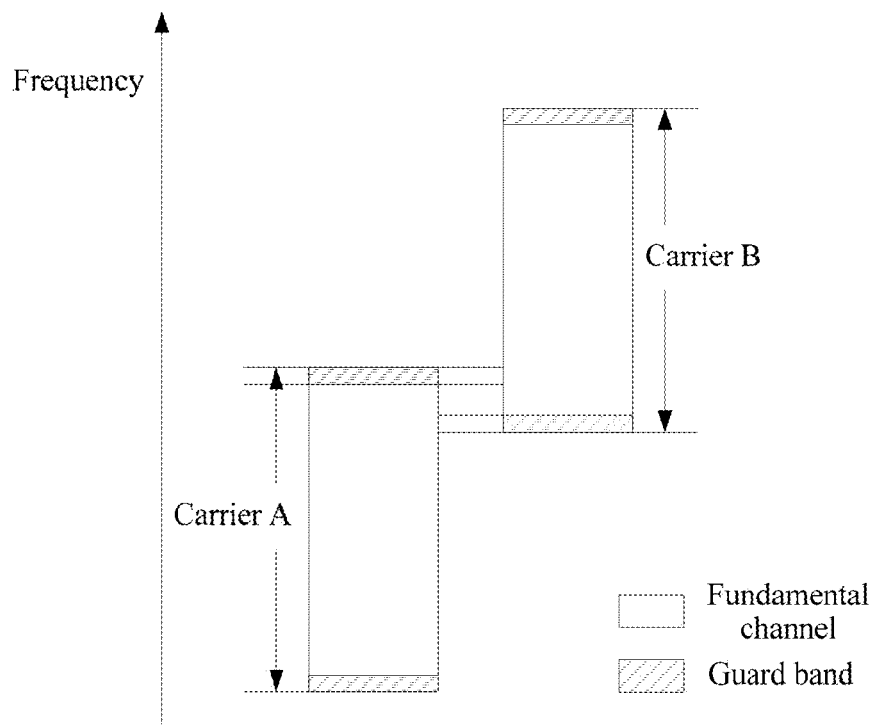

Optionally, it should be noted that both the first carrier and the second carrier may have a guard band. For both the first carrier and the second carrier, a transmit power on the guard band is 0, that is, no power is sent. A carrier in an LTE system is used as an example. For a carrier in the LTE system, there is a guard band that occupies 5% of a bandwidth of the carrier on each side of the carrier. As shown in FIG. 7a, if a bandwidth of the carrier in the LTE system is 10 M, a bandwidth of a spectrum on which a transmit power of the carrier is greater than 0 is only 9 M, and there is a guard band of a bandwidth of 0.5 M on each side of a spectrum occupied by the carrier, and the transmit power of the carrier on two guard bands of a bandwidth of 0.5 M is 0. Specifically, a guard band of the spectrum occupied by the first carrier and a guard band of the spectrum occupied by the second carrier may overlap. For example, as shown in FIG. 7b, both the carrier A and the carrier B have a guard band, and a guard band of the spectrum occupied by the carrier A and a guard band of the spectrum occupied by the carrier B overlap. Alternatively, a guard band of the spectrum occupied by the first carrier and a fundamental channel of the second carrier may overlap, and a guard band of the spectrum occupied by the second carrier and a fundamental channel of the first carrier may overlap. For example, as shown in FIG. 7c, both the carrier A and the carrier B have a guard band, a guard band of the spectrum occupied by the carrier A and a fundamental channel of the carrier B overlap, and a guard band of the spectrum occupied by the carrier B and a fundamental channel of the carrier A overlap.

Figure 7E:
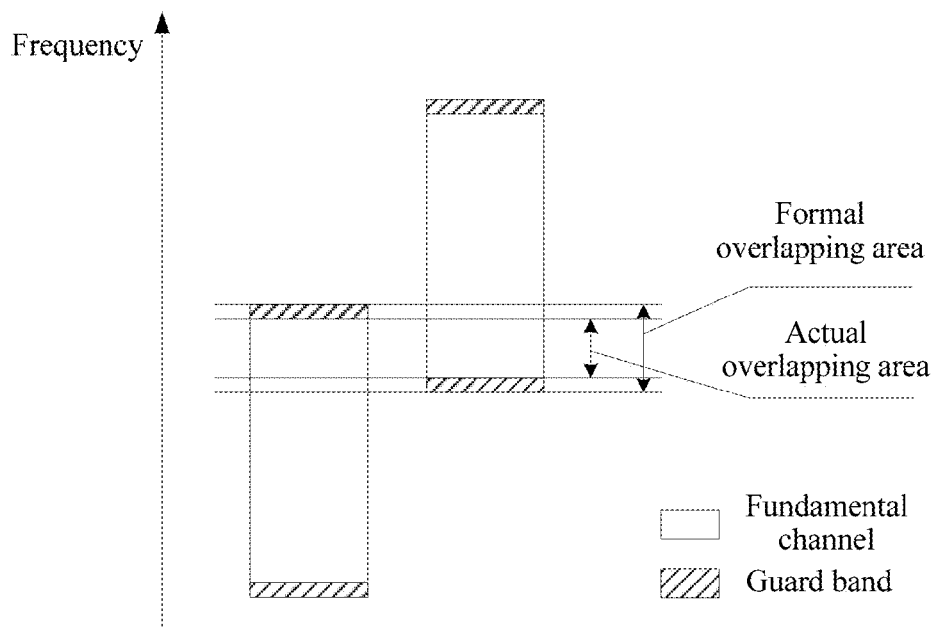
FIG. 7e is an illustrative schematic diagram of an overlapping area between two carriers having a guard band according to an embodiment of the present disclosure.
Figure 7F:
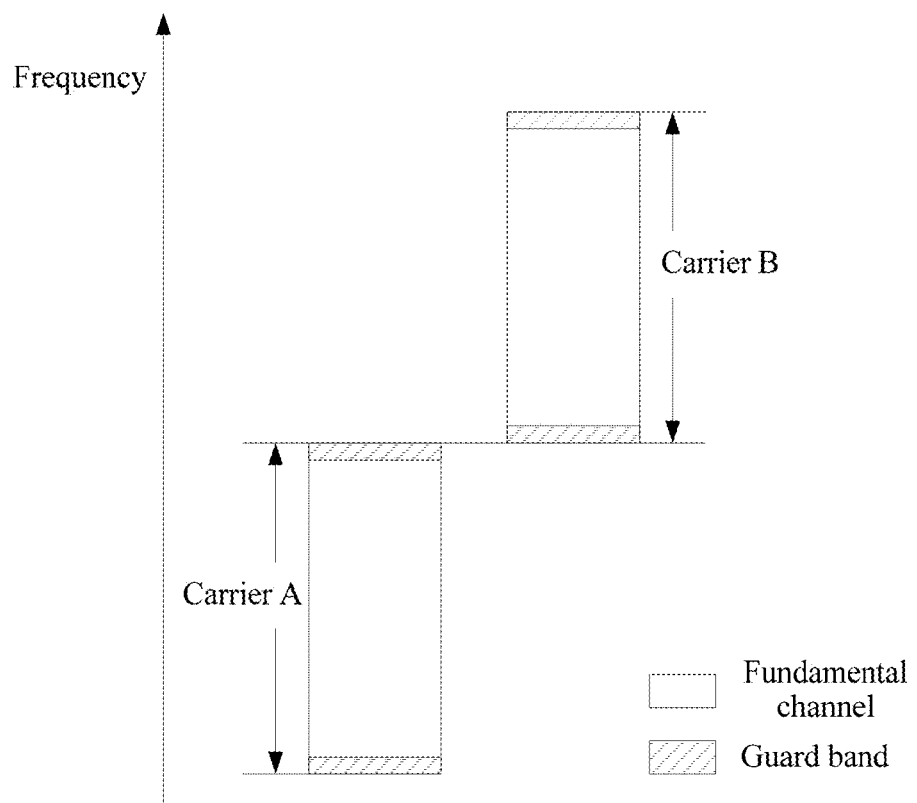
FIG. 7f is an illustrative schematic diagram of configuring two carriers having a guard band on a spectrum in the prior art.

In addition, it should be further noted that, as shown in FIG. 7e, because the carrier in the LTE system has a guard band, when spectrums occupied by two carriers in the LTE system overlap, a formal overlapping area is greater than an actual overlapping area. The formal overlapping area includes a spectrum occupied by an overlapping guard band, and the actual overlapping area does not include a spectrum occupied by an overlapping guard band. In this case, the spectrums occupied by the two carriers are partially overlapping, completely overlapping, or overlapping in an embedded manner, so that a part that is on a total frequency band occupied by the two carriers and that does not send a fundamental channel is reduced, and spectrum resource utilization is further improved. As shown in FIG. 7f, in the prior art, on the spectrums occupied by the two carriers in the LTE system, a transmit power on spectrums occupied by four guard bands is 0. As shown in FIG. 7c, in the present disclosure, the formal overlapping area includes spectrums occupied by two more guard bands when compared with the actual overlapping area. Two guard bands in the four guard bands are used in an overlapping part between the two carriers. A fundamental channel can be properly sent on spectrums occupied by the two guard bands, so that on the spectrums occupied by the two carriers in an LTE system, a transmit power on spectrums occupied by only two guard bands is 0. Therefore, spectrum resource utilization of a carrier in the LTE system is further improved.

In addition, in the prior art, in a process of sharing a spectrum by carriers in different communications standards, if a bandwidth of a spectrum occupied by a carrier in one of the communications standards is increased, a bandwidth of a spectrum occupied by a carrier in another communications standard is reduced. Consequently, the spectrum occupied by the carrier whose bandwidth is reduced may fall in the spectrum occupied by the carrier whose bandwidth is increased, the carrier whose bandwidth is reduced causes in-band interference to the carrier whose bandwidth is increased, and interference between carriers in different communications standards is relatively serious.

In this embodiment of the present disclosure, however, a total bandwidth of spectrums occupied by multiple carriers on limited spectrum resources is adjusted by adjusting a bandwidth of an overlapping spectrum between the multiple carriers. Therefore, a sufficient space on a spectrum can be allocated to a carrier in another communications standard, thereby eliminating in-band interference.

Optionally, the first carrier and the second carrier belong to a same communications standard, for example, both the first carrier and the second carrier are carriers in an LTE system. Alternatively, the first carrier and the second carrier belong to different communications standards, for example, the first carrier is a carrier in an LTE system, and the second carrier is a carrier in a GSM communications system.

Optionally, the first carrier and the second carrier are two independent cells; or the first carrier is a primary carrier, and the second carrier is a secondary carrier corresponding to the first carrier.

Further, the signal of the second carrier carries the fundamental channel of the second carrier, and time division multiplexing or frequency division multiplexing is performed, on an overlapping spectrum, between the fundamental channel of the second carrier and the fundamental channel of the first carrier. The time division multiplexing or the frequency division multiplexing is corresponding to the first carrier or the second carrier in a time unit or a frequency unit. The time unit may be a timeslot, a symbol, or the like. The time division multiplexing or the frequency division multiplexing cannot be corresponding to both the first carrier and the second carrier in a same time unit or frequency unit; that is, on an overlapping spectrum, the fundamental channel of the second carrier deviates from the fundamental channel of the first carrier in a time domain or a frequency domain, thereby avoiding mutual interference between the fundamental channel of the first carrier and the fundamental channel of the second carrier.

Both the fundamental channel of the second carrier and the fundamental channel of the first carrier include at least one of a common channel (CCH), a common control channel, a dedicated control channel, a shared channel, and a random access channel. An LTE system is used as an example. The common channel includes a primary synchronization channel, a secondary synchronization channel, a physical broadcast channel (PBCH), a cell-specific reference signal (CRS), and the like, where the cell-specific reference signal is a common pilot channel. The common control channel includes a physical control format indicator channel (PCFICH) and a physical random access channel (PRACH). The dedicated control channel includes a physical downlink control channel (PDCCH) and a physical uplink control channel (PUCCH). The shared channel includes a physical downlink shared channel (PDSCH), a physical multicast channel (PMCH), a physical uplink shared channel (PUSCH), and the like. It should be noted that the fundamental channel includes but is not limited to the foregoing common channel, common control channel, dedicated control channel, shared channels, or random access channel.

Figure 8A:
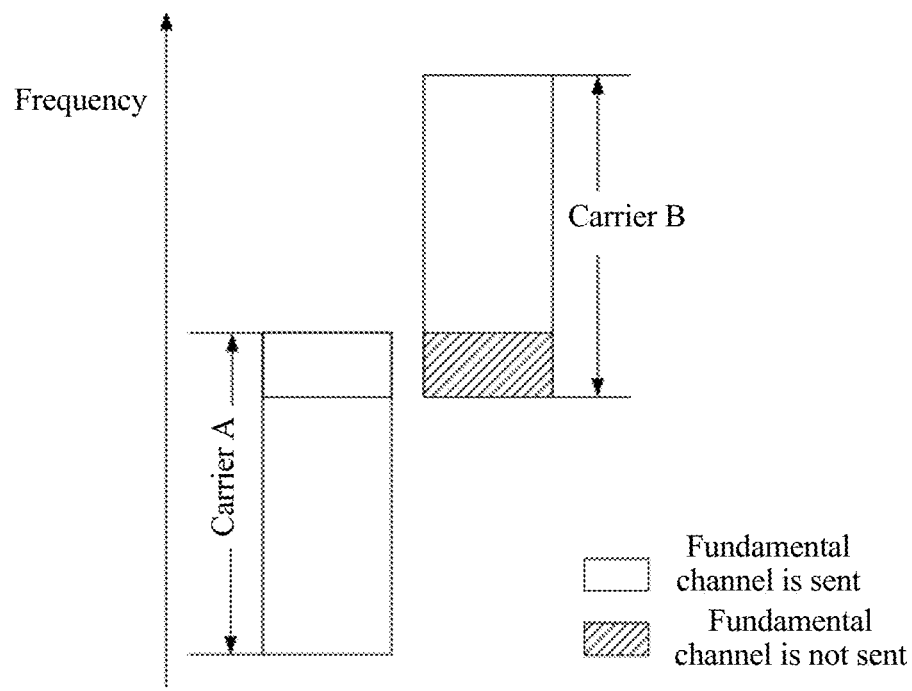
FIG. 8a and FIG. 8b are illustrative schematic diagrams of examples in which frequency division multiplexing is performed on an overlapping spectrum according to an embodiment of the present disclosure.
Figure 8B:
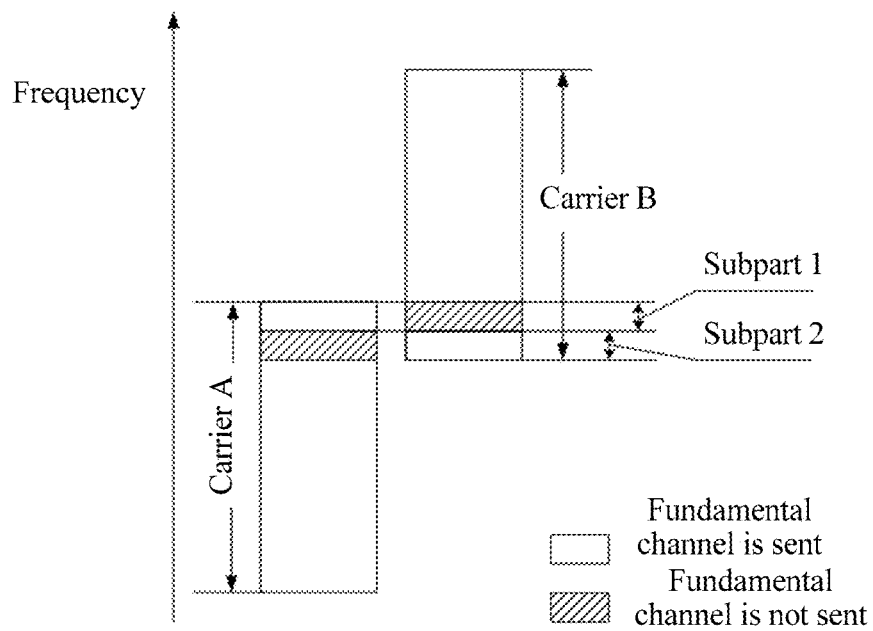

Specifically, on an overlapping part between the spectrum occupied by the first carrier and the spectrum occupied by the second carrier, when one carrier in the first carrier and the second carrier sends a fundamental channel, the other carrier does not send a fundamental channel. For example, as shown in FIG. 8a, on an overlapping spectrum between the carrier A and the carrier B, the carrier A sends the fundamental channel, and the carrier B does not send the fundamental channel. Alternatively, the overlapping part between the first carrier and the second carrier is divided into several subparts; on each subpart, when one carrier in the first carrier and the second carrier sends a fundamental channel, the other carrier does not send a fundamental channel. For example, as shown in FIG. 8b, the overlapping part between the carrier A and the carrier B is divided into a subpart 1 and a subpart 2; on the subpart 1, the carrier A sends the fundamental channel, and the carrier B does not send the fundamental channel; and on the subpart 2, the carrier B sends the fundamental channel, and the carrier A does not send the fundamental channel. Alternatively, within an acceptable redundancy ranges of the first carrier and the second carrier in a communications system, both the first carrier and the second carrier properly send the fundamental channel. The foregoing implementation method is mainly applied when the overlapping part between the spectrum occupied by the first carrier and the spectrum occupied by the second carrier is relatively wide, for example, when a bandwidth of the overlapping part is greater than an overlapping bandwidth threshold.

When the overlapping part between the spectrum occupied by the first carrier and the spectrum occupied by the second carrier is relatively narrow, for example, when a bandwidth of the overlapping spectrum is less than or equal to an overlapping bandwidth threshold, both the first carrier and the second carrier can properly send the fundamental channel on the overlapping spectrum. For example, bandwidths of the first carrier and the second carrier both are 5 M, the bandwidth of the overlapping spectrum between the first carrier and the second carrier is 0.5 M, and both the first carrier and the second carrier send the fundamental channel on the overlapping spectrum of 0.5 M.

It should be noted that because features of carriers in communications systems in different communications standards are different, when a carrier is controlled to send a fundamental channel on the overlapping spectrum between the first carrier and the second carrier, a feature of a carrier also needs to be considered. For example, when only guard bands of the first carrier and the second carrier overlap, the fundamental channel of the first carrier and the fundamental channel of the second carrier do not overlap. Therefore, the first carrier properly sends the fundamental channel of the first carrier, and the second carrier properly sends the fundamental channel of the second carrier.

Figure 8C:
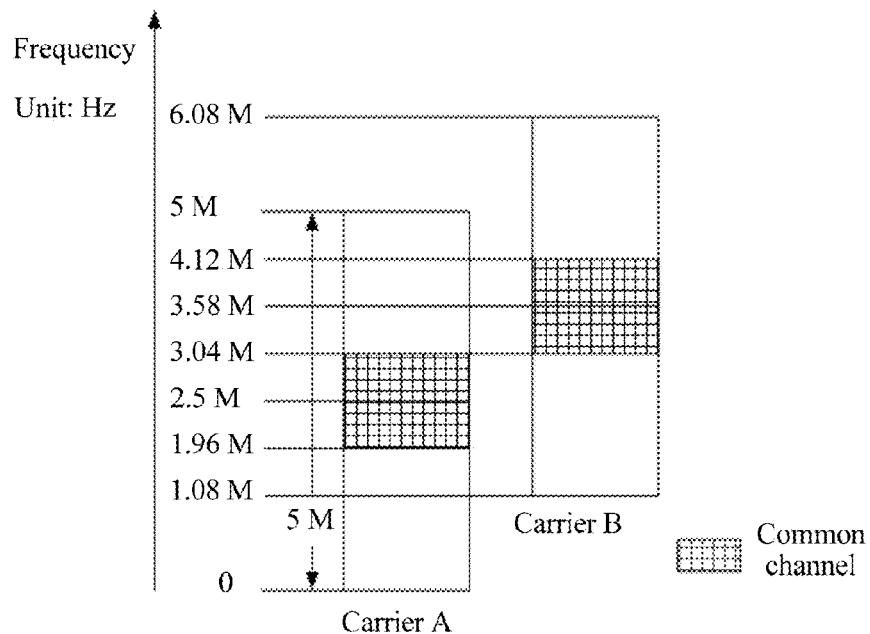
FIG. 8c is an illustrative schematic diagram of an example that is for performing frequency division multiplexing on an overlapping spectrum and that is corresponding to a common channel according to an embodiment of the present disclosure.

The following gives specific examples for specific content of performing frequency division multiplexing or time division multiplexing on the overlapping spectrum when the fundamental channel is a specific channel. It should be noted that the specific content of performing frequency division multiplexing or time division multiplexing on the overlapping spectrum is not limited to the following examples.

a. When the fundamental channel is a common channel, the first carrier may be used as a fundamental carrier, and a common channel (CCH, Common Channel) of the first carrier is not adjusted. A location of the second carrier on a spectrum is changed by means of frequency division multiplexing, so that a spectrum of the common channel of the first carrier deviates from a spectrum of a common channel of the second carrier. It should be noted that, for a purpose of ensuring that the subcarrier of the first carrier and the subcarrier of the second carrier are orthogonal on the overlapping part between the first carrier and the second carrier, it needs to be ensured that a spacing between a center frequency of the first carrier and a center frequency of the second carrier is a bandwidth that is an integer multiple of either of the subcarriers, so as to ensure that the subcarrier of the first carrier and the subcarrier of the second carrier are orthogonal. A carrier in an LTE system is used as an example for description. A bandwidth of a subcarrier of the carrier in the LTE system is 15 kHz. In addition, a difference between center frequencies of two carriers in the LTE system is required to be an integer multiple of 100 kHz. Therefore, for the carrier in the LTE system, the difference between center frequencies of two carriers is required to be an integer multiple of a least common multiple of 15 kHz and 100 kHz. For example, the two carriers in the LTE system are separately the carrier A and the carrier B. Bandwidths of the carrier A and the carrier B are both 5 MHz, a common channel of the carrier in the LTE system is in a center of the carrier, and a bandwidth is 1.08 MHz. As shown in FIG. 8c, the carrier A is on a frequency band of 0 to 5 MHz, and the carrier B is on a frequency band of 1.08 MHz to 6.08 MHz. A common channel of the carrier A occupies a frequency band of 1.96 MHz to 3.04 MHz, and a common channel of the carrier B occupies a frequency band of 3.04 MHz to 4.12 MHz. A spectrum of the common channel of the carrier A deviates from a spectrum of the common channel of the carrier B, that is, spectrums of the common channel of the carrier A and the common channel of the carrier B do not overlap.

Figure 8D:
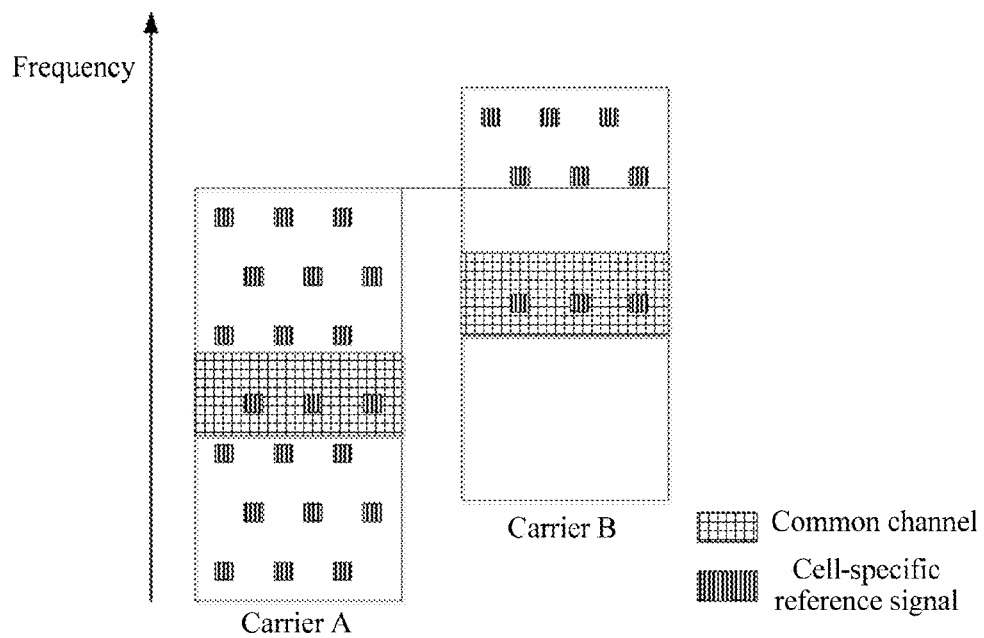
FIG. 8d is an illustrative schematic diagram of an example that is for performing frequency division multiplexing on an overlapping spectrum and that is corresponding to a cell-specific reference signal according to an embodiment of the present disclosure.

Optionally, when the fundamental channel is a common channel, a common channel of a carrier is sent at a fixed time instead of being continuously sent in a time domain, For example, for the carrier in an LTE system, the common channel is sent on the last two symbols of the first and the eleventh timeslots of each radio frame. For another example, an MIB (Master Information Block, master information block) is sent in the first timeslot of each radio frame. When the spectrum occupied by the first carrier and the spectrum occupied by the second carrier overlap, and spectrums occupied by common channels of the two carriers also overlap, radio frames of the two carriers may be deviated for a specific quantity of symbols or timeslots, so that times at which the two carriers send the common channels are deviated, that is, time division multiplexing is performed on the overlapping spectrum. It should be noted that when one carrier sends a common channel, the other carrier does not send an RE (Resource Element, resource element). Specifically, when one carrier sends a common channel, the other carrier may be controlled not to schedule a PRB (Physical Resource Block, physical resource block) for use; or when one carrier sends a common channel, a carrier control device controls the other carrier to schedule a PRB for use, but not to send power on a resource element, thereby avoiding interference of the resource element to the common channel.

b. When the fundamental channel is a cell-specific reference signal, where the cell-specific reference signal is a common pilot channel, the first carrier is used as a fundamental carrier, and distribution of the cell-specific reference signal on the first carrier is not changed. Distribution of a cell-specific reference signal sent by the second carrier is adjusted, and the second carrier sends the cell-specific reference signal on a spectrum occupied by a common channel of the second carrier, so as to ensure synchronization performance of the second carrier. In addition, the second carrier sends the cell-specific reference signal on a non-overlapping spectrum between the second carrier and the first carrier. For a purpose of avoid excessively strong mutual interference between common pilot channels of the two carriers that is caused by overlap between the cell-specific reference signal in the common channel of the second carrier and the cell-specific reference signal of the first carrier, a location of the second carrier on a spectrum is adjusted, so that a spectrum of the cell-specific reference signal in the common channel of the second carrier and a spectrum of a cell-specific reference signal of the first carrier are deviated. Specifically, when the two carriers belong to different cells, the two carriers may be classified into different groups by configuring PCIs (Physical Cell ID, physical cell identifier). Distribution of cell-specific reference signals of carriers in different groups are different, so that the spectrums of the cell-specific reference signal in the common channel of the second carrier and the cell-specific reference signal of the first carrier are deviated, thereby achieving a purpose of performing frequency division multiplexing on the overlapping spectrum. Alternatively, the cell-specific reference signal in the common channel of the second carrier and the cell-specific reference signal of the first carrier may be deviated by changing a spectrum location of the second carrier. For example, as shown in FIG. 8d, for the carrier A and the carrier B in the LTE system, the carrier B sends a cell-specific reference signal on a spectrum of a common channel and a non-overlapping spectrum between the carrier B and the carrier A; and a cell-specific reference signal on the common channel of the carrier B and a cell-specific reference signal on the carrier A do not overlap.

Figure 8E:
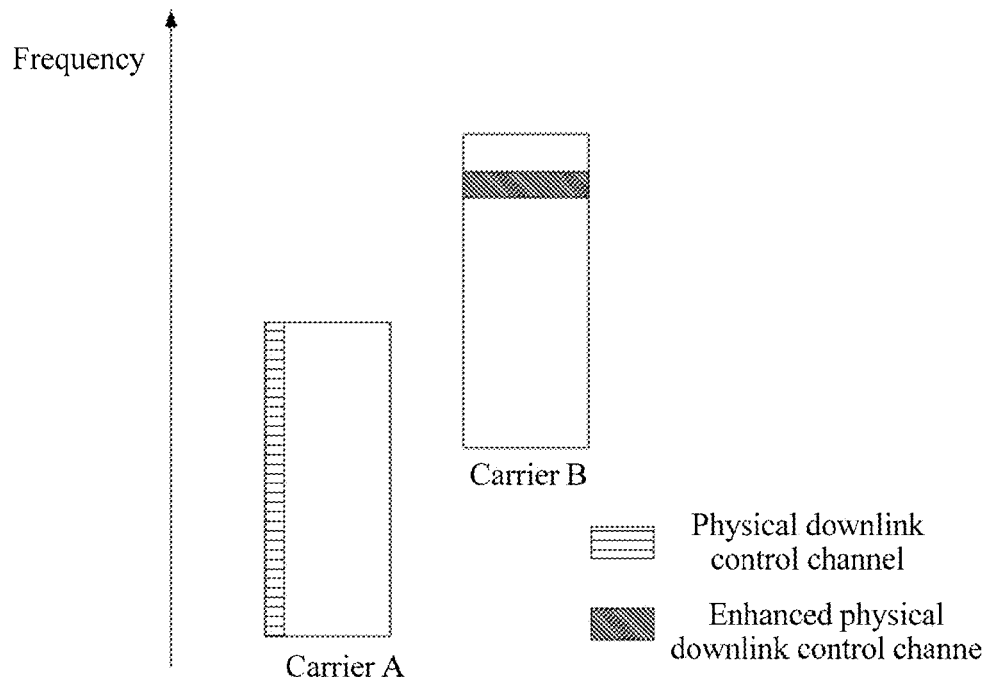
FIG. 8e is an illustrative schematic diagram of an example that is for performing frequency division multiplexing on an overlapping spectrum and that is corresponding to a physical downlink control channel according to an embodiment of the present disclosure.
Figure 8F:
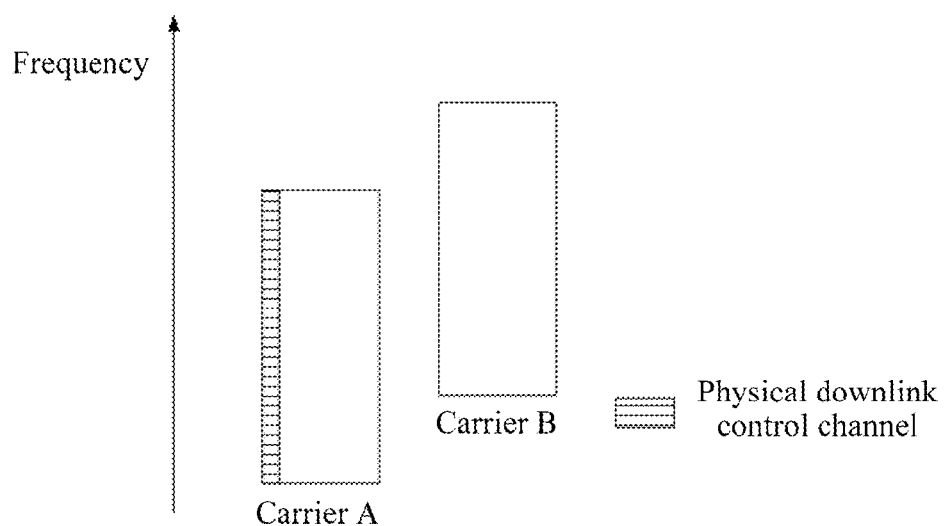
FIG. 8f and FIG. 8g are illustrative schematic diagrams of examples in which two carriers send physical downlink control channels according to an embodiment of the present disclosure.
Figure 8G:
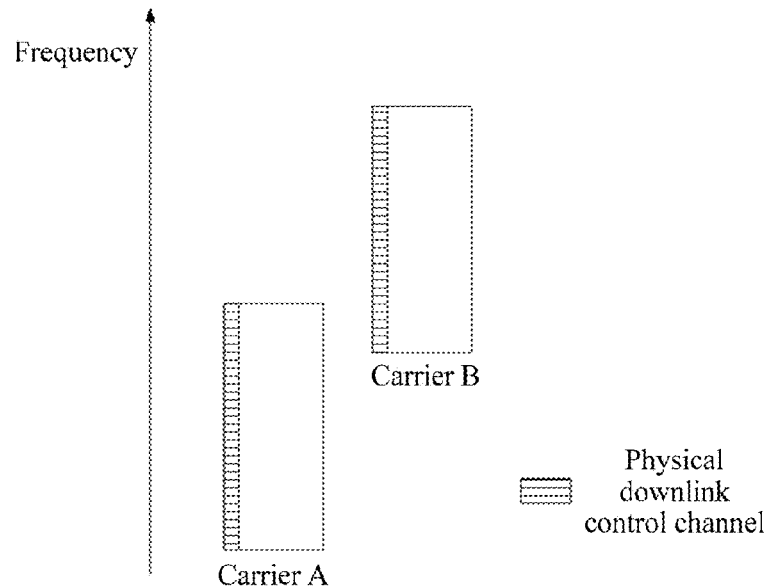

Optionally, when the fundamental channel is a cell-specific reference signal, a radio frame of the second carrier and a radio frame of the first carrier are deviated for n symbols or timeslots in a time domain, that is, a sending time of the cell-specific reference signal on the common channel of the second carrier is adjusted to be deviated from a sending time of the cell-specific reference signal of the first carrier. It should be noted that n is a positive integer, and a value of n is determined by distribution of a cell-specific reference signal of the first carrier and a cell-specific reference signal of the second carrier. After the radio frame of the second carrier and the radio frame of the first carrier are deviated for n symbols or timeslots in a time domain, it is ensured that the cell-specific reference signal of the first carrier and the cell-specific reference signal of the second carrier do not overlap, or are deviated in a time domain, that is, time division multiplexing is performed on the overlapping spectrum.

c. When the fundamental channel is a physical downlink control channel, the second carrier may send an enhanced physical downlink control channel on a non-overlapping spectrum between the first carrier and the second carrier. The enhanced physical downlink control channel (ePDCCH) is a type of a physical downlink control channel (PDCCH). However, the enhanced physical downlink control channel does not need to be sent on a full frequency band of a carrier. The enhanced physical downlink control channel may be set to be sent on a specific frequency band of the carrier. The second carrier sends the enhanced physical downlink control channel on the non-overlapping spectrum between the second carrier and the first carrier. For example, as shown in FIG. 8e, the carrier A sends a physical downlink control channel on a full frequency band, and the carrier B sends an enhanced physical downlink control channel on a non-overlapping part between the spectrum exclusive for the carrier B and the spectrum occupied by the carrier A. In addition, it should be noted that because the physical downlink control channel is sent on a full frequency band of a spectrum occupied by the carrier, when the overlapping part between the spectrum occupied by the first carrier and the spectrum occupied by the second carrier is relatively wide, that is, when the bandwidth of the overlapping part exceeds a specific threshold, for example, the bandwidth of the overlapping part occupies two thirds of a bandwidth of the first carrier, the first carrier can properly send a physical downlink control channel on the spectrum occupied by the first carrier, and the second carrier does not send a physical downlink control channel, thereby avoiding interference that is between the physical downlink control channel of the first carrier and the physical downlink control channel of the second carrier and that affects channel performance. For example, as shown in FIG. 8f, a bandwidth of the overlapping part between the spectrum occupied by the carrier A and the spectrum occupied by the carrier B exceeds a half of a bandwidth of the carrier A. The carrier A sends the physical downlink control channel on the full frequency band, and the carrier B does not send a physical downlink control channel. Alternatively, when the overlapping part between the spectrum occupied by the first carrier and the spectrum occupied by the second carrier is relatively narrow, that is, when the bandwidth of the overlapping part does not exceed a specific threshold, for example, the bandwidth of the overlapping part occupies one third of a bandwidth of either of the carriers, both the first carrier and the second carrier send the physical downlink control channel on full frequency bands of the spectrums that are respectively occupied by the first carrier and the second carrier. For example, as shown in FIG. 8g, a bandwidth of the overlapping part between the carrier A and the carrier B is less than a half of a bandwidth of the carrier A. The carrier A sends a physical downlink control channel on a full frequency band, and the carrier B sends a physical downlink control channel on a full frequency band.

Figure 8H:
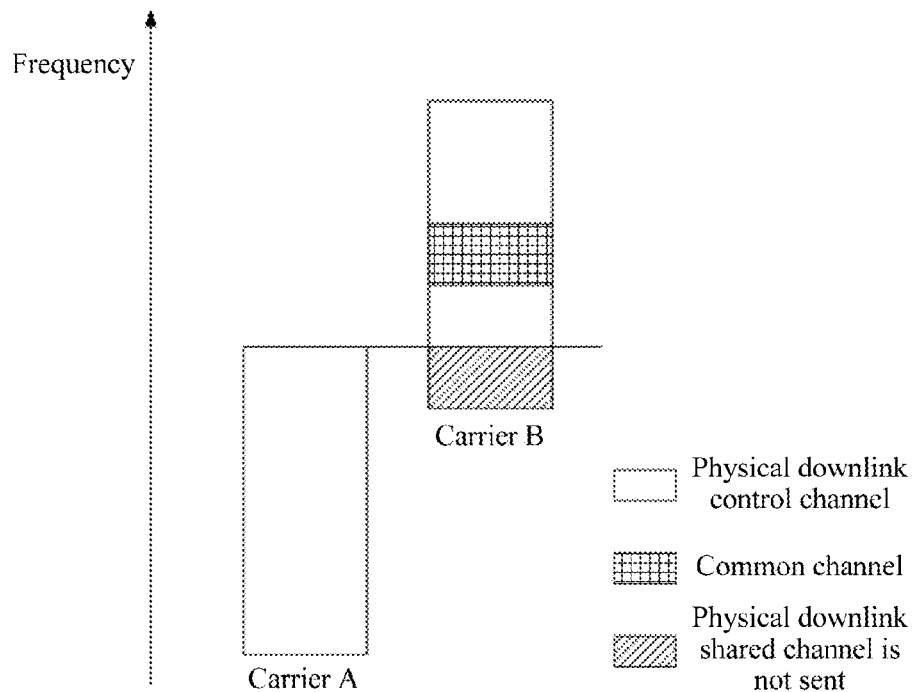
FIG. 8h is an illustrative schematic diagram of an example that is for performing frequency division multiplexing on an overlapping spectrum and that is corresponding to a physical downlink shared channel according to an embodiment of the present disclosure.
Figure 8I:
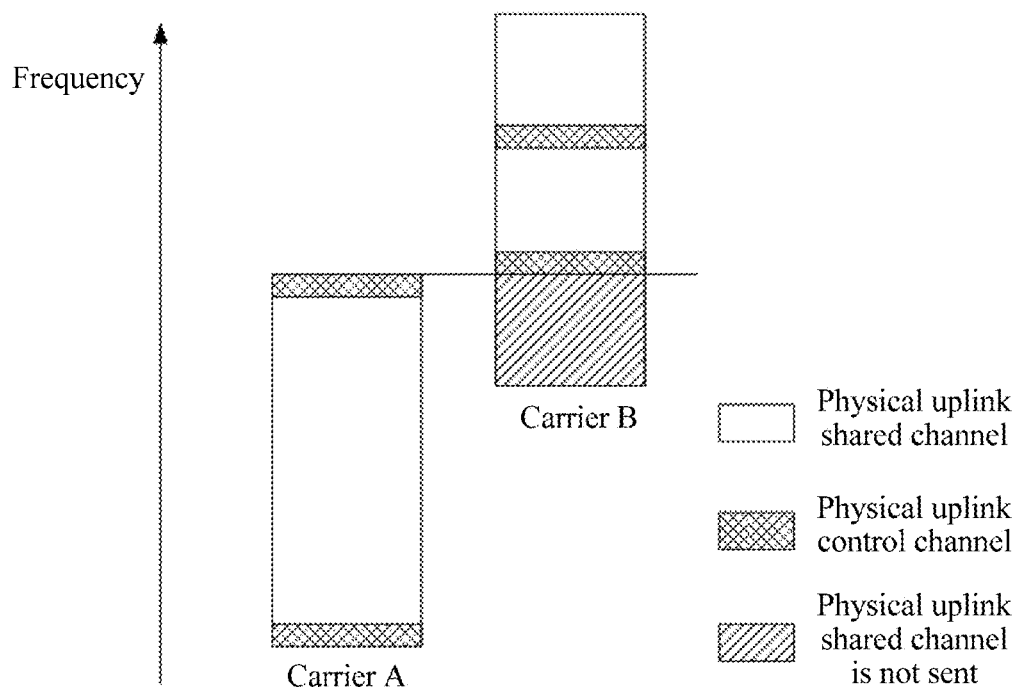
FIG. 8i is an illustrative schematic diagram of an example that is for performing frequency division multiplexing on an overlapping spectrum and that is corresponding to an uplink channel according to an embodiment of the present disclosure.

It should be further noted that channel processing methods for a physical control format indicator channel and a physical hybrid automatic repeat request indicator channel are similar to a channel processing method for the physical downlink control channel.

d. When the fundamental channel is a physical downlink shared channel, the first carrier is used as a fundamental carrier, and the first carrier properly sends a physical downlink shared channel. When a spectrum occupied by a common channel of the second carrier and the spectrum occupied by the first carrier do not overlap, the second carrier does not send a physical downlink shared channel on the overlapping spectrum between the second carrier and the first carrier and the spectrum of the common channel of the second carrier, and the second carrier sends the physical downlink shared channel on the non-overlapping part between the second carrier and the first carrier other than the spectrum occupied by the common channel of the second carrier. For example, as shown in FIG. 8h, a spectrum occupied by a common channel of the carrier B and the spectrum occupied by the carrier A do not overlap. The carrier A properly sends a physical downlink shared channel, and the carrier B does not send a physical downlink shared channel on the overlapping part between the carrier A and the carrier B. The carrier B sends the physical downlink shared channel on the non-overlapping part between the carrier A and the carrier B other than the spectrum occupied by the common channel of the carrier B.

e. When the fundamental channel is an uplink channel, where the uplink channel includes a physical uplink control channel and a physical uplink shared channel, and a spectrum occupied by a physical uplink control channel on the second carrier and a spectrum occupied by a physical uplink shared channel on the first carrier overlap, the second carrier does not send a physical uplink shared channel on the overlapping spectrum. A spectrum location of the physical uplink control channel of the second carrier is changed until the spectrum occupied by the physical uplink control channel of the second carrier and the spectrum occupied by the first carrier are deviated. For example, as shown in FIG. 8i, on the overlapping part between the spectrum occupied by the carrier B and the spectrum occupied by the carrier A, the carrier B does not send a physical uplink shared channel. A physical uplink control channel of the carrier B is moved toward a center frequency of the carrier B, so that the physical uplink control channel of the carrier B and a physical uplink control channel of the carrier A are deviated. Both the carrier A and the carrier B send physical uplink shared channels on other spectrums other than a spectrum of the physical uplink control channel and a spectrum on which the physical uplink shared channel is not sent.

All the above content is specific examples for performing, on the overlapping spectrum, time division multiplexing or frequency division multiplexing between the fundamental channel of the second carrier and the fundamental channel of the first carrier. The time division multiplexing or the frequency division multiplexing is performed on the overlapping spectrum, thereby avoiding the interference between the fundamental channel of the first carrier and the fundamental channel of the second carrier.

The following describes a method for processing the fundamental channel of the first carrier and the fundamental channel of the second carrier when the frequency division multiplexing or the time division multiplexing cannot be performed, on the overlapping spectrum, between the fundamental channel of the first carrier and the fundamental channel of the second carrier.

When the frequency division multiplexing or the time division multiplexing cannot be performed, on the overlapping spectrum, between the fundamental channel of the first carrier and the fundamental channel of the second carrier, subframe start moments of the first carrier and the second carrier are offset for a specific time unit, so as to overlap a first fundamental channel of the first carrier and a second fundamental channel of the second carrier. A transmit power of the second fundamental channel of the second carrier on the overlapping spectrum is reduced to be less than a preset threshold or to be 0, or a transmit power of the first fundamental channel of the first carrier on the overlapping spectrum is reduced to be less than a preset threshold or to be 0.

Both the fundamental channel of the second carrier and the fundamental channel of the first carrier include at least one of a common channel, a common control channel, a dedicated control channel, a shared channel, and a random access channel. The first fundamental channel of the first carrier is one of fundamental channels of the first carrier, the second fundamental channel of the second carrier is one of fundamental channels of the second carrier, and the first fundamental channel and the second fundamental channel are channels of different types.

Figure 9A:
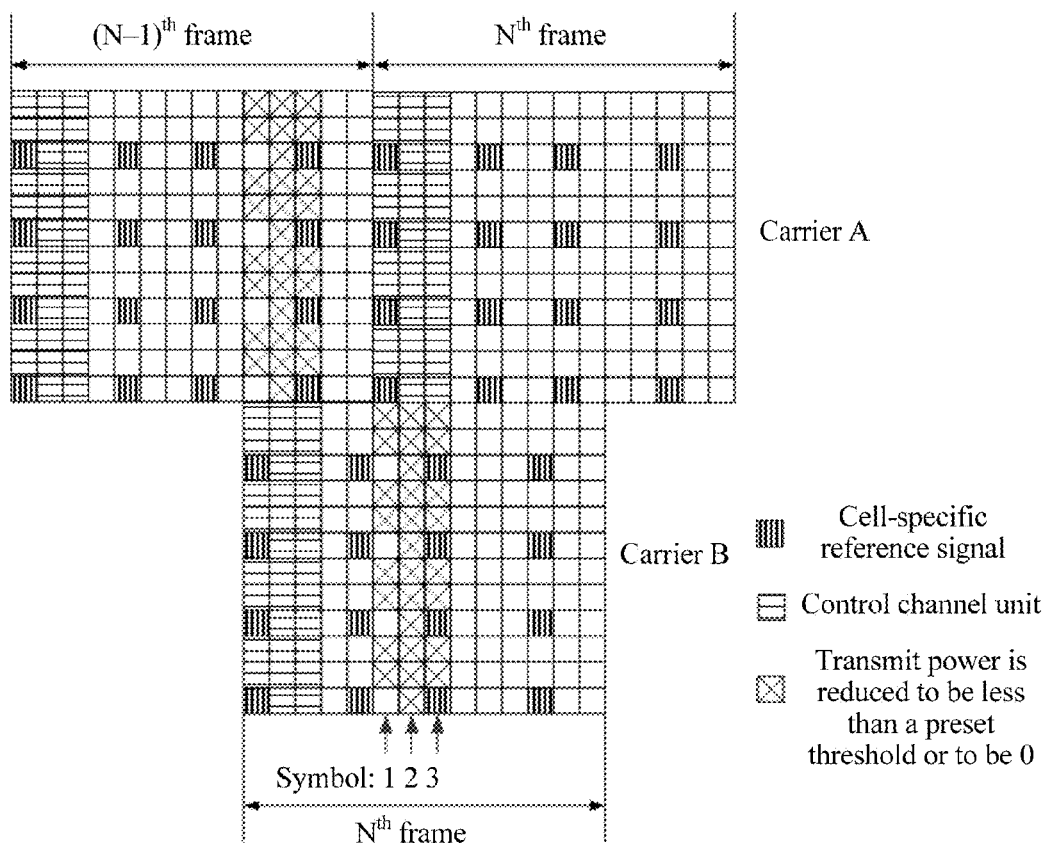
FIG. 9a, FIG. 9b, and FIG. 9c are illustrative schematic diagrams of an overlapping part between a first fundamental channel and a second fundamental channel according to an embodiment of the present disclosure.
Figure 9B:
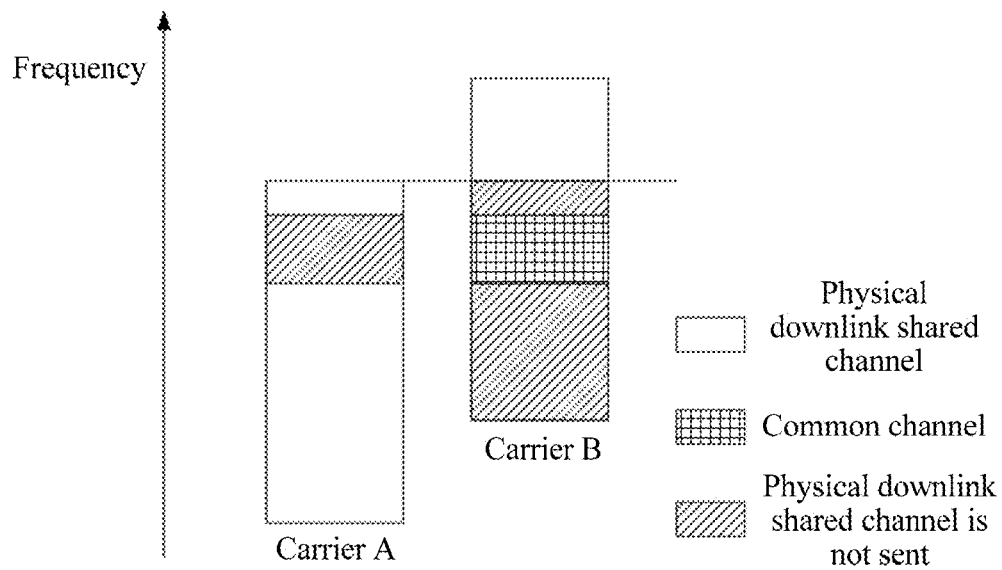
Figure 9C:
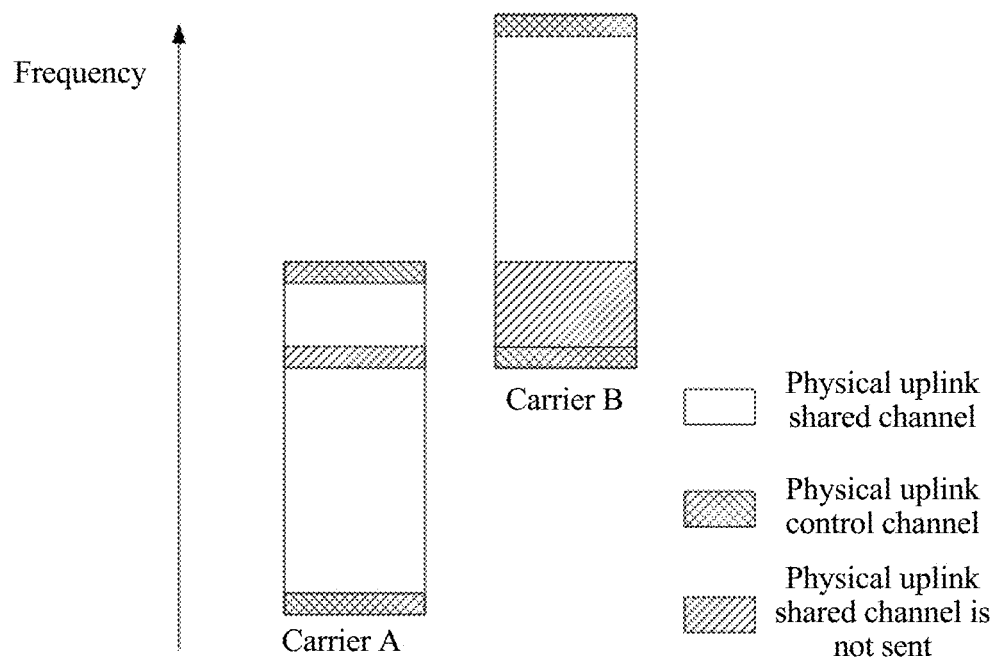

The following gives specific examples for content of overlapping the first fundamental channel and the second fundamental channel that is of the second carrier and changing a transmit power when the first fundamental channel and the second fundamental channel are specific channels. However, it should be noted that the specific content of overlapping the first fundamental channel and the second fundamental channel that is of the second carrier and changing a transmit power is not limited to the following examples.

a. When the first fundamental channel of the first carrier is a physical downlink shared channel, and the second fundamental channel of the second carrier is a physical downlink control channel, a subframe start moment of the second carrier is offset for a specific time unit, so as to overlap the physical downlink control channel of the second carrier and the physical downlink shared channel of the first carrier. For example, a sending time of a physical downlink control channel of the first carrier is not changed. Specifically, a timeslot in which the second carrier sends the physical downlink control channel and a timeslot in which the first carrier sends the physical downlink control channel are deviated for an interval of one or more symbols, so as to overlap the physical downlink control channel of the second carrier and the physical downlink shared channel of the first carrier. A transmit power of the first carrier on the physical downlink shared channel is reduced to be less than a preset threshold or to be 0, where 0 represents that there is no transmit power; or a transmit power of the second carrier on the physical downlink control channel is reduced to be less than a preset threshold or to be 0. For example, as shown in FIG. 9a, the $n^{th}$ radio frame of the carrier B deviates from the $n^{th}$ radio frame of the carrier A for five symbols. A sending time of a symbol for sending a physical downlink control channel by the carrier B is corresponding to a sending time of a symbol for sending a physical downlink shared channel by the carrier A, and the carrier A does not send power on the symbol of the physical downlink shared channel. In addition, a sending time of a symbol for sending a physical downlink control channel by the carrier A is corresponding to a sending time of a symbol for sending a physical downlink shared channel by the carrier B, and the carrier B does not send power on the symbol of the physical downlink shared channel.

b. When the first fundamental channel of the first carrier is a physical downlink shared channel, the second fundamental channel of the second carrier is a common channel, and when the common channel of the second carrier and the physical downlink shared channel overlap, a transmit power of the common channel of the second carrier is not changed, and a transmit power of the physical downlink shared channel of the first carrier is reduced to be less than a preset threshold or to be 0. The first carrier properly sends the physical downlink shared channel on a non-overlapping part between the physical downlink shared channel of the first carrier and the common channel of the second carrier, and the second carrier properly sends the physical downlink shared channel on a non-overlapping part between the first carrier and the second carrier and on the common channel of the second carrier. For example, as shown in FIG. 9b, the carrier A does not send a physical downlink shared channel on an overlapping part between the carrier A and a common channel of the carrier B, and the carrier A sends the physical downlink shared channel on the remaining spectrum of the carrier A. The carrier B sends a physical downlink shared channel on a spectrum occupied by the common channel of the carrier B; the carrier B further sends the physical downlink shared channel on a non-overlapping spectrum between the carrier A and the carrier B; and the carrier B does not send the physical downlink shared channel on the remaining spectrum of the carrier B.

c. When the first fundamental channel of the first carrier is a physical uplink shared channel, the second fundamental channel of the second carrier is a physical uplink control channel, and the physical uplink control channel of the second carrier and the physical uplink shared channel of the first carrier overlap, the first carrier does not send a physical uplink control channel on an overlapping part between a physical uplink shared channel of the second carrier and the first carrier, that is, a transmit power is reduced to be less than a preset threshold or to be 0; the first carrier does not send the physical uplink shared channel on an overlapping spectrum between the physical uplink control channel of the second carrier and the physical uplink shared channel of the first carrier. For example, as shown in FIG. 9c, when the physical uplink control channel of the carrier B and a physical uplink shared channel of the carrier A overlap, the carrier A properly sends a physical uplink control channel, the carrier B does not send a physical uplink shared channel on an overlapping spectrum between the carrier A and the physical uplink shared channel of the carrier B, and the carrier A does not send the physical uplink shared channel on an overlapping spectrum between the physical uplink shared channel of the carrier A and the physical uplink control channel of the carrier B.

All the above content is specific examples for overlapping the first fundamental channel and the second fundamental channel that is of the second carrier and changing a transmit power when the first fundamental channel and the second fundamental channel are specific channels. Interference between the first fundamental channel of the first carrier and the second fundamental channel of the second carrier is avoided by overlapping the first fundamental channel and the second fundamental channel that is of the second carrier and changing a transmit power.

Figure 10:
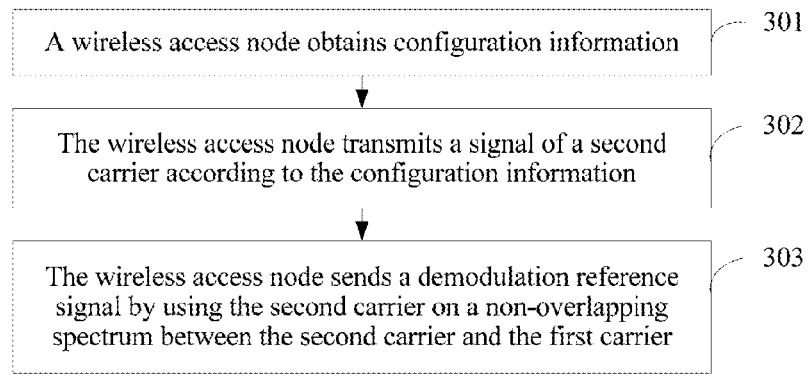
FIG. 10 is a flowchart of another signal transmission method according to an embodiment of the present disclosure.

Further, when the second fundamental channel of the second carrier is a common pilot channel, based on the solution shown in FIG. 6, an embodiment of the present disclosure further provides a specific solution of the signal transmission method, that is, step 303 is added. As shown in FIG. 10, the signal transmission method further includes:

303. The wireless access node sends a demodulation reference signal by using the second carrier on a non-overlapping spectrum between the second carrier and the first carrier.

The demodulation reference signal is used for data demodulation of the non-overlapping spectrum of the second carrier. It should be noted that, on the overlapping spectrum between the second carrier and the first carrier, if the second carrier does not send the cell-specific reference signal, demodulation performance of a fundamental channel whose demodulation is based on the cell-specific reference signal may significantly deteriorate on the non-overlapping spectrum between the second carrier and the first carrier. In addition to channel data, the second carrier may further send the demodulation reference signal used for fundamental channel demodulation on the non-overlapping spectrum, so as to ensure the demodulation performance of the fundamental channel.

According to the signal transmission method provided in this embodiment of the present disclosure, configuration information can be obtained, and a signal of a second carrier is transmitted according to the configuration information. The configuration information is used by a wireless access node to transmit the signal of the second carrier in coverage space of a first carrier. A spectrum occupied by the first carrier and a spectrum occupied by the second carrier overlap, and a subcarrier of the first carrier and a subcarrier of the second carrier are orthogonal. Compared with the prior art in which multiple carriers are sequentially configured on a spectrum in a non-overlapping manner, in the present disclosure, the signal of the second carrier is transmitted in the coverage space of the first carrier, the spectrum occupied by the first carrier and the spectrum occupied by the second carrier overlap, and the subcarrier of the first carrier and the subcarrier of the second carrier are orthogonal, thereby avoiding interference between the first carrier and the second carrier. Because spectrums occupied by the first carrier and the second carrier overlap, a total bandwidth of spectrums occupied by multiple carriers including the first carrier and the second carrier may be adjusted by adjusting a bandwidth of an overlapping spectrum between the first carrier and the second carrier, so that an appropriate quantity of carriers can be configured on limited spectrum resources, thereby eliminating an unused frequency band on a spectrum, fully using the spectrum, and improving spectrum resource utilization. In addition, because power of one or more fundamental channels is reduced, demodulation performance of another fundamental channel significantly deteriorates. For a purpose of ensuring the demodulation performance of the other fundamental channel, a demodulation reference signal is sent by using the second carrier on a non-overlapping spectrum between the second carrier and the first carrier. Therefore, the demodulation performance of the other fundamental channel is improved.

Figure 11:
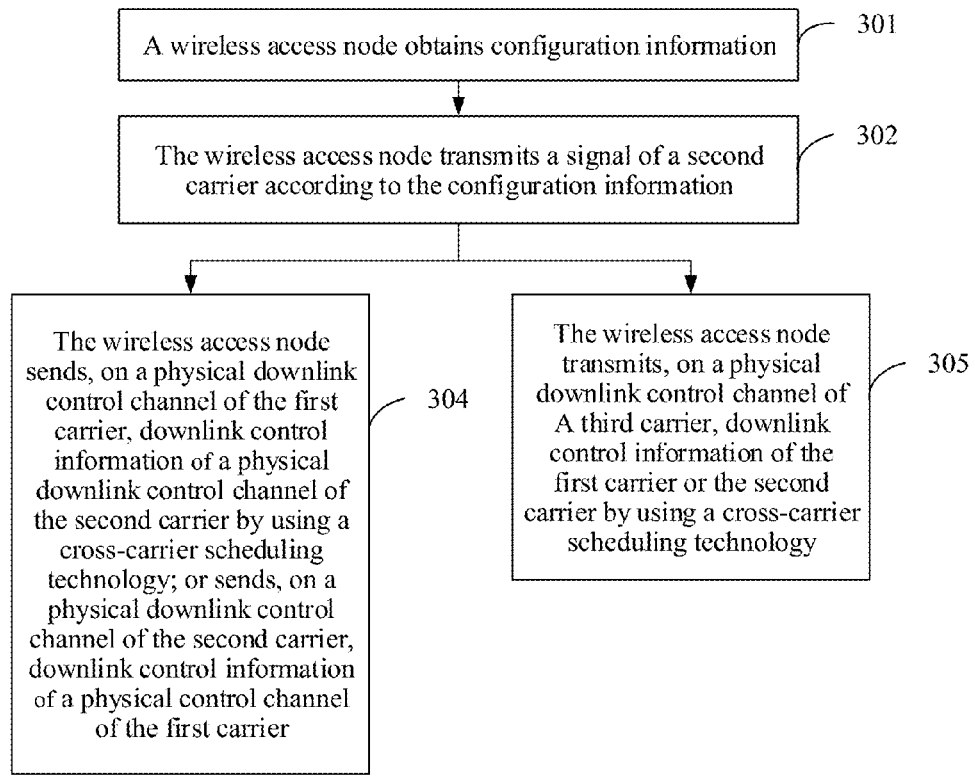
FIG. 11 is a flowchart of still another signal transmission method according to an embodiment of the present disclosure.

Further, when the fundamental channel of the first carrier and the fundamental channel of the second carrier are physical downlink control channels, based on the solution shown in FIG. 6, an embodiment of the present disclosure further provides a specific solution of the signal transmission method, that is, step 304 or 305 is added. As shown in FIG. 11, the signal transmission method further includes:

304. The wireless access node sends, on a physical downlink control channel of the first carrier, downlink control information of a physical downlink control channel of the second carrier by using a cross-carrier scheduling technology; or sends, on a physical downlink control channel of the second carrier, downlink control information of a physical downlink control channel of the first carrier.

The cross-carrier scheduling technology is used, to avoid mutual interference between the physical downlink control channel of the first carrier and the physical downlink control channel of the second carrier.

305. The wireless access node transmits, on a physical downlink control channel of a third carrier, downlink control information of the first carrier or the second carrier by using a cross-carrier scheduling technology.

Figure 11A:
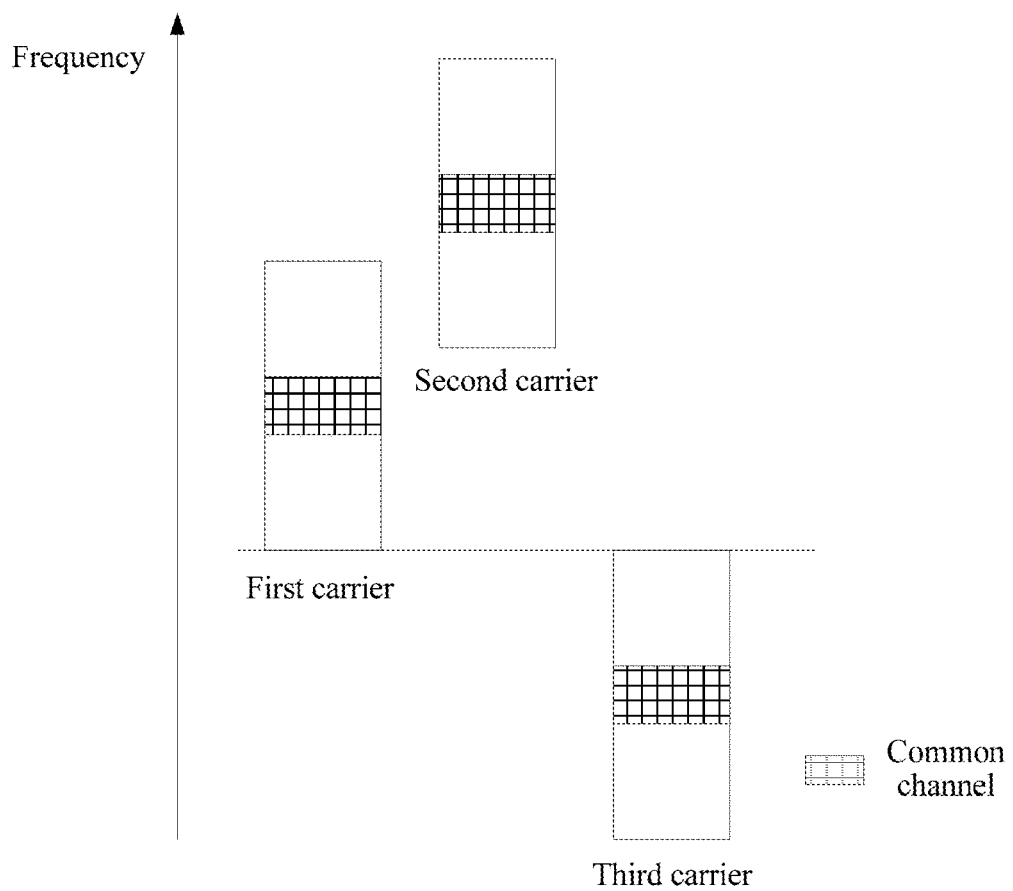
FIG. 11a is an illustrative schematic diagram of a relationship between a first carrier, a second carrier, and a third carrier according to an embodiment of the present disclosure.
Figure 11B:
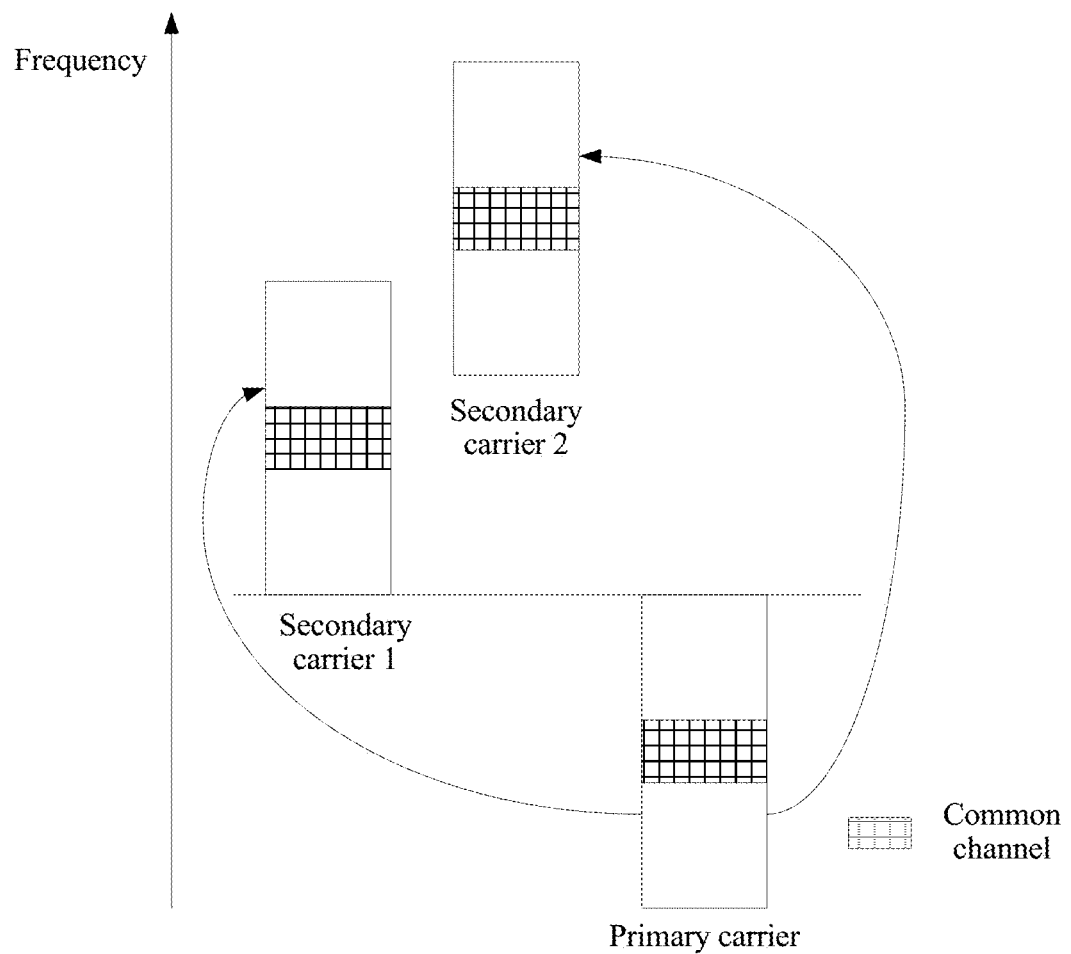
FIG. 11b and FIG. 11c are illustrative schematic diagrams of examples for configuring a primary carrier and a secondary carrier according to an embodiment of the present disclosure.
Figure 11C:
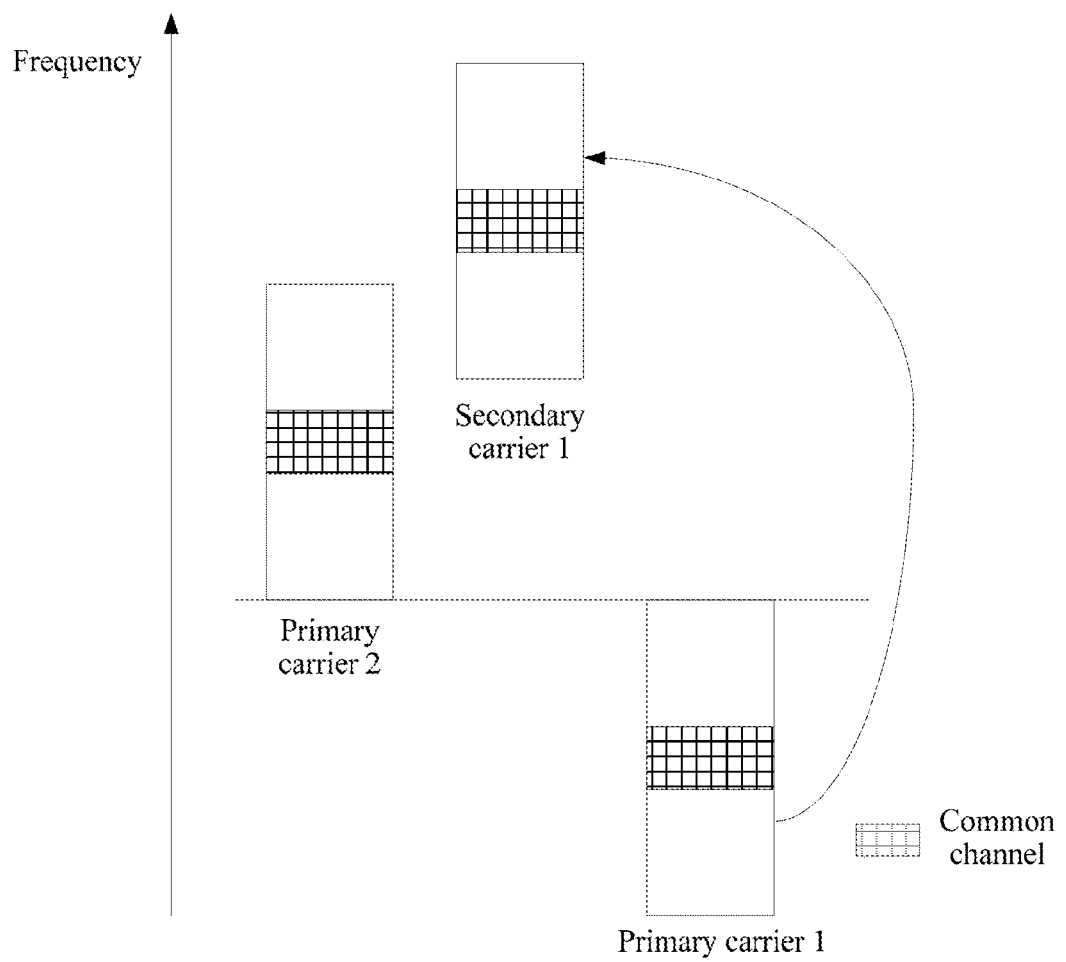

As shown in FIG. 11a, the third carrier and the first carrier do not overlap, and the third carrier and the second carrier do not overlap. Optionally, the third carrier is a primary carrier, and both the first carrier and the second carrier may be secondary carriers corresponding to the third carrier. For example, as shown in FIG. 11b, both a secondary carrier 1 and a secondary carrier 2 are secondary carriers corresponding to a primary carrier, and spectrums of the secondary carrier 1 and the secondary carrier 2 overlap. Alternatively, the third carrier is a primary carrier, the first carrier is a primary carrier, and the second carrier is a secondary carrier corresponding to the third carrier. For example, as shown in FIG. 11c, a secondary carrier 1 is a secondary carrier corresponding to a primary carrier 1, and spectrums of a primary carrier 2 and the secondary carrier 1 overlap.

Optionally, the first carrier, the second carrier, and the third carrier belong to a same communications standard. For example, the first carrier, the second carrier, and the third carrier are carriers in an LTE system. Alternatively, the first carrier, the second carrier, and the third carrier belong to different communications standards. For example, the first carrier is a carrier in an LTE system, the second carrier is a carrier in a GSM communications system, and the third carrier is a carrier in a WiFi communications system. Alternatively, any two carriers in the first carrier, the second carrier, and the third carrier belong to a same communications standard, and another carrier and the any two carriers belong to different communications standards. For example, both the first carrier and the second carrier are carriers in an LTE system, and the third carrier is a carrier in a GSM communications system. For another example, both the first carrier and the third carrier are carriers in an LTE system, and the second carrier is a carrier in a GSM communications system.

Figure 12A:
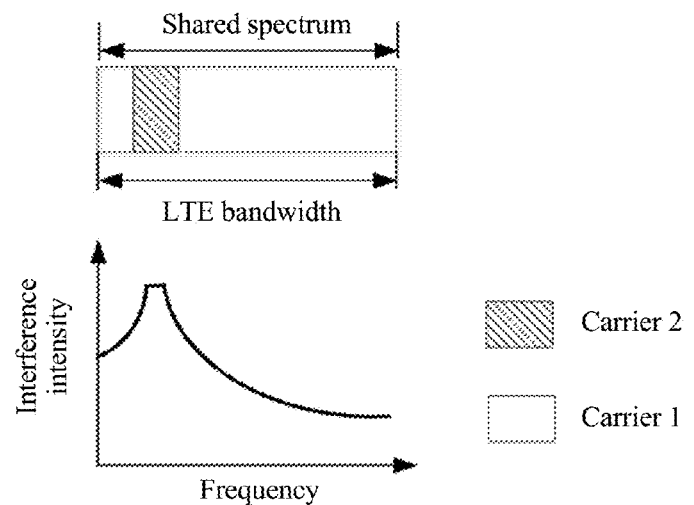
FIG. 12a is an illustrative schematic diagram of an example in which carriers in communications systems in different communications standards occupy a shared spectrum in the prior art.

In addition, in the prior art, communications systems in different communications standards often share a shared spectrum. As shown in FIG. 12a, spectrums of a carrier 1 that belongs to a communications system A and a carrier 2 that belongs to a communications system B overlap, and the carrier 1 causes great interference to the carrier 2. To eliminate interference between carriers in different communications systems that share a shared spectrum, this embodiment may be further applied in configuration of the carriers on the shared spectrum, and a location of the third carrier is configured on the shared spectrum according to specific locations of the first carrier and the second carrier that are configured on a spectrum.

A load change of a communications system to which the first carrier and the second carrier belong may be periodically obtained, and the specific locations of the first carrier and the second carrier on a spectrum and the overlapping part between the first carrier and the second carrier are adjusted according to the load change. Likewise, the specific locations of the first carrier and the second carrier on a spectrum are periodically obtained, and the location of the third carrier on the shared spectrum is determined according to the specific locations, so as to configure the third carrier. It should be noted that a period for obtaining the load change and a period for obtaining the specific locations of the first carrier and the second carrier may be at a minute level to an hour level.

Figure 12B:
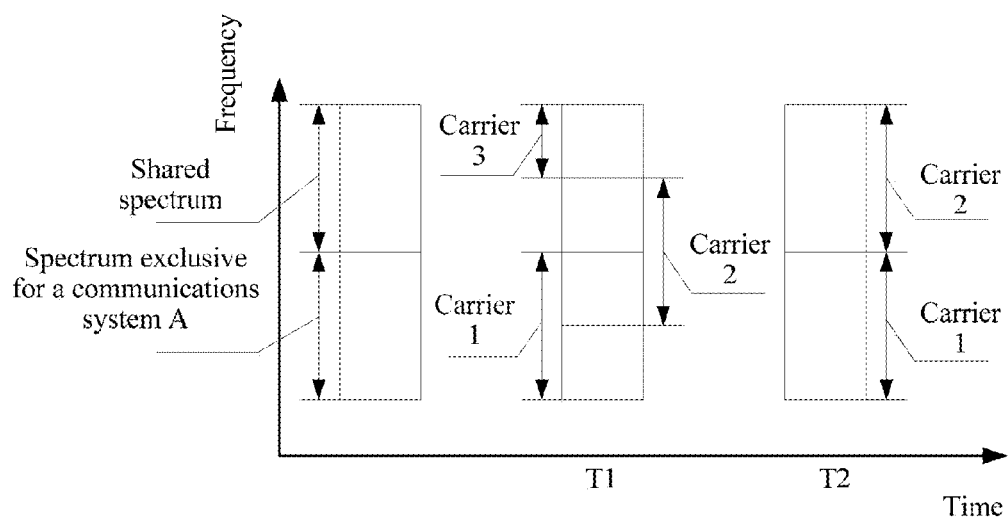
FIG. 12b is an illustrative schematic diagram of an example in which carriers in communications systems in different communications standards occupy a shared spectrum according to an embodiment of the present disclosure.

For example, as shown in FIG. 12b, a carrier 1 and a carrier 2 belong to a communications system A, and a carrier 3 belongs to a communications system B. At a T1 moment, spectrums of the carrier 1 and the carrier 2 partially overlap, and the carrier 2 occupies a part of the shared spectrum. Therefore, a shared spectrum that can be occupied by the carrier 3 is determined according to specific locations of the carrier 1 and the carrier 2 on the spectrum, and the carrier 3 is configured on the spectrum, thereby avoiding mutual interference between carriers in communications systems indifferent communications standards. At a T2 moment, the carrier 2 occupies all the shared spectrum, and the carrier 3 is removed from the shared spectrum, thereby avoiding mutual interference between carriers in communications systems in different communications standards.

Figure 12C:
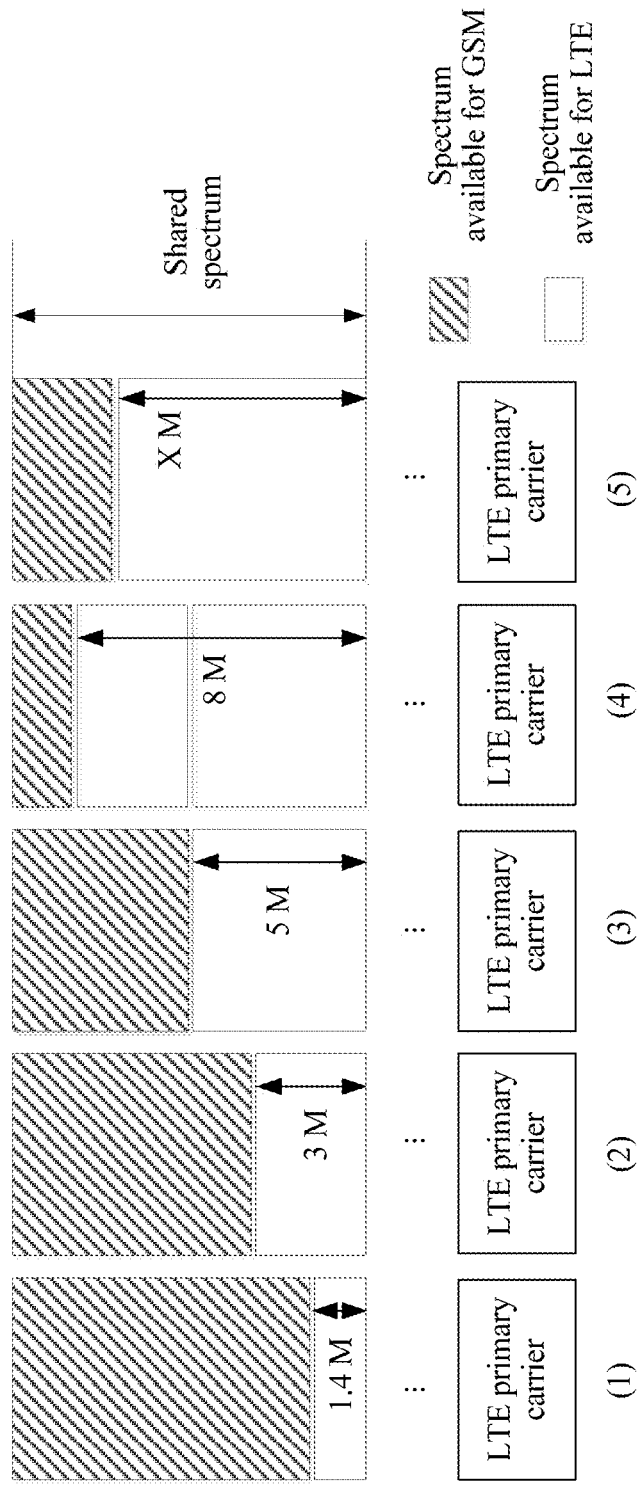
FIG. 12c is an illustrative schematic diagram of another example in which carriers in communications systems in different communications standards occupy a shared spectrum according to an embodiment of the present disclosure.

It should be noted that a first carrier and a second carrier that are not overlapping may be further configured on the spectrum. In this case, the first carrier is a primary carrier, and the second carrier is a secondary carrier. The specific location of the third carrier on the shared spectrum is adjusted by setting the second carrier, that is, the secondary carrier, on the shared spectrum. For example, as shown in FIG. 12c, there are a carrier of an LTE system and a carrier of a GSM system in FIG. 12c. As shown in (1), (2), and (3) in FIG. 12c, a secondary carrier of an LTE standard width may be configured on the shared spectrum. A bandwidth of a carrier of an LTE standard width includes 1.4 MHz, 3 MHz, 5 MHz, 10 MHz, 15 MHz, 20 MHz, or the like. As shown in (4) in FIG. 12c, multiple secondary carriers of an LTE standard width may be configured on the shared spectrum, for example, secondary carriers of 3 MHz+5 MHz=8 MHz. As shown in (5) in FIG. 12c, a secondary carrier of a non-LTE standard width may be further configured on the shared spectrum, for example, a secondary carrier of X MHz, where X is a positive number. A frequency band that is not occupied by a secondary carrier in the LTE system can be used for configuring a carrier in the GSM system.

According to the signal transmission method provided in this embodiment of the present disclosure, configuration information can be obtained, and a signal of a second carrier is transmitted according to the configuration information. The configuration information is used by a wireless access node to transmit the signal of the second carrier in coverage space of a first carrier. A spectrum occupied by the first carrier and a spectrum occupied by the second carrier overlap, and a subcarrier of the first carrier and a subcarrier of the second carrier are orthogonal. Compared with the prior art in which multiple carriers are sequentially configured on a spectrum in a non-overlapping manner, in the present disclosure, the signal of the second carrier is transmitted in the coverage space of the first carrier, the spectrum occupied by the first carrier and the spectrum occupied by the second carrier overlap, and the subcarrier of the first carrier and the subcarrier of the second carrier are orthogonal, thereby avoiding interference between the first carrier and the second carrier. Because spectrums occupied by the first carrier and the second carrier overlap, a total bandwidth of spectrums occupied by multiple carriers including the first carrier and the second carrier may be adjusted by adjusting a bandwidth of an overlapping spectrum between the first carrier and the second carrier, so that an appropriate quantity of carriers can be configured on limited spectrum resources, thereby eliminating an unused frequency band on a spectrum, fully using the spectrum, and improving spectrum resource utilization. In addition, downlink control information of a carrier can be sent on a downlink control channel of another carrier by using a cross-carrier scheduling technology, thereby avoiding a situation in which downlink control information cannot be sent and that is caused by a reduced transmit power of a downlink control channel of a carrier. In addition, specific locations of the two carriers on a shared spectrum are adjusted, so as to determine locations of carriers that are in communications systems indifferent communications standards and that are configured on the shared spectrum. Therefore, spread of interference between multiple carriers in the communications systems in different communications standards in a frequency domain is avoided, and communication performance of the communications systems in different communications standards on the shared spectrum are improved.

The embodiments in this specification are all described in a progressive manner, for same or similar parts in the embodiments, reference may be made to these embodiments, and each embodiment focuses on a difference from other embodiments. Especially, a device embodiment is basically similar to a method embodiment, and therefore is described briefly; for related parts, refer to partial descriptions in the method embodiment.

What is claimed is:

1. A wireless access node, comprising:
a network interface configured to obtain configuration information for use by the wireless access node to transmit a signal of a second carrier in coverage space of a first carrier, wherein a spectrum occupied by the first carrier and a spectrum occupied by the second carrier, both located on a total bandwidth of spectrums, overlap, wherein the spectrum occupied by the first carrier and the spectrum occupied by the second carrier overlap so that there are no unused frequency bands on the total bandwidth of spectrums, and wherein a subcarrier of the first carrier and a subcarrier of the second carrier are orthogonal; and
a processor configured to transmit the signal of the second carrier according to the configuration information.

2. The wireless access node according to claim 1, wherein the spectrum occupied by the first carrier and the spectrum occupied by the second carrier are partially overlapping, completely overlapping, or overlapping in an embedded manner.

3. The wireless access node according to claim 1, wherein the first carrier and the second carrier belong to a same communications standard or different communications standards.

4. The wireless access node according to claim 1, wherein:
the first carrier and the second carrier are two independent cells; or
the first carrier is a primary carrier, and the second carrier is a secondary carrier corresponding to the first carrier.

5. The wireless access node according to claim 1, wherein:
the signal of the second carrier carries a fundamental channel of the second carrier, wherein time division multiplexing or frequency division multiplexing is performed, on an overlapping spectrum, between the fundamental channel of the second carrier and a fundamental channel of the first carrier, and the time division multiplexing or the frequency division multiplexing corresponds to the first carrier or the second carrier in a time unit or a frequency unit; and
both the fundamental channel of the second carrier and the fundamental channel of the first carrier comprise at least one of a common channel, a common control channel, a dedicated control channel, a shared channel, and a random access channel.

6. A wireless access node comprising:
a network interface configured to obtain configuration information for use by the wireless access node to transmit a signal of a second carrier in coverage space of a first carrier, wherein a spectrum occupied by the first carrier and a spectrum occupied by the second carrier overlap, and wherein a subcarrier of the first carrier and a subcarrier of the second carrier are orthogonal;
a processor configured to transmit the signal of the second carrier according to the configuration information;
wherein when frequency division multiplexing or time division multiplexing cannot be performed, on an overlapping spectrum, between a fundamental channel of the first carrier and a fundamental channel of the second carrier, subframe start moments of the first carrier and the second carrier are offset for a specific time unit, so as to overlap a first fundamental channel of the first carrier and a second fundamental channel of the second carrier, wherein a transmit power of the second fundamental channel of the second carrier on the overlapping spectrum is reduced to be less than a preset threshold or to be 0, or a transmit power of the first fundamental channel of the first carrier on the overlapping spectrum is reduced to be less than a preset threshold or to be 0;
wherein both the fundamental channel of the second carrier and the fundamental channel of the first carrier comprise at least one of a common channel, a common control channel, a dedicated control channel, a shared channel, and a random access channel; and
wherein the first fundamental channel of the first carrier is one of fundamental channels of the first carrier, the second fundamental channel of the second carrier is one of fundamental channels of the second carrier, and the first fundamental channel and the second fundamental channel are channels of different types.

7. The wireless access node according to claim 1, wherein:
a guard band of the spectrum occupied by the first carrier and a guard band of the spectrum occupied by the second carrier overlap; or
a guard band of the spectrum occupied by the first carrier and a fundamental channel of the second carrier overlap; or
a guard band of the spectrum occupied by the second carrier and a fundamental channel of the first carrier overlap.

8. The wireless access node according to claim 6, wherein when the second fundamental channel of the second carrier is a common pilot channel, the processor is configured to:
send a demodulation reference signal by using the second carrier on a non-overlapping spectrum between the second carrier and the first carrier, wherein the demodulation reference signal is used for data demodulation of the non-overlapping spectrum of the second carrier.

9. The wireless access node according to claim 6, wherein when the fundamental channel of the first carrier and the fundamental channel of the second carrier are physical downlink control channels, the processor is configured to:
send, on a physical downlink control channel of the first carrier, downlink control information of a physical downlink control channel of the second carrier by using a cross-carrier scheduling technology; or
send, on a physical downlink control channel of the second carrier, downlink control information of a physical downlink control channel of the first carrier.

10. The wireless access node according to claim 1, wherein the processor is configured to:

transmit, on a physical downlink control channel of a third carrier, downlink control information of the first carrier or the second carrier by using a cross-carrier scheduling technology, wherein:
the third carrier and the first carrier do not overlap, and the third carrier and the second carrier do not overlap; and
the third carrier is a primary carrier, and both the first carrier and the second carrier are secondary carriers corresponding to the third carrier; or
the third carrier is a primary carrier, the first carrier is a primary carrier, and the second carrier is a secondary carrier corresponding to the third carrier.

11. A signal transmission method, comprising:
obtaining, by a wireless access node, configuration information for use by the wireless access node to transmit a signal of a second carrier in coverage space of a first carrier, wherein a spectrum occupied by the first carrier and a spectrum occupied by the second carrier, both located on a total bandwidth of spectrums, overlap, wherein the spectrum occupied by the first carrier and the spectrum occupied by the second carrier overlap so that there are no unused frequency bands on the total bandwidth of spectrums, and wherein a subcarrier of the first carrier and a subcarrier of the second carrier are orthogonal; and
transmitting, by the wireless access node, the signal of the second carrier according to the configuration information.

12. The method according to claim 11, wherein the spectrum occupied by the first carrier and the spectrum occupied by the second carrier are partially overlapping, completely overlapping, or overlapping in an embedded manner.

13. The method according to claim 11, wherein the first carrier and the second carrier belong to a same communications standard or different communications standards.

14. The method according to claim 11, wherein:
the first carrier and the second carrier are two independent cells; or
the first carrier is a primary carrier, and the second carrier is a secondary carrier corresponding to the first carrier.

15. The method according to claim 11, wherein:
the signal of the second carrier carries a fundamental channel of the second carrier, wherein time division multiplexing or frequency division multiplexing is performed, on an overlapping spectrum, between the fundamental channel of the second carrier and a fundamental channel of the first carrier, and the time division multiplexing or the frequency division multiplexing corresponds to the first carrier or the second carrier in a time unit or a frequency unit; and
both the fundamental channel of the second carrier and the fundamental channel of the first carrier comprise at least one of a common channel, a common control channel, a dedicated control channel, a shared channel, and a random access channel.

16. A signal transmission method comprising:
obtaining, by a wireless access node, configuration information for use by the wireless access node to transmit a signal of a second carrier in coverage space of a first carrier, wherein a spectrum occupied by the first carrier and a spectrum occupied by the second carrier overlap, and wherein a subcarrier of the first carrier and a subcarrier of the second carrier are orthogonal;

transmitting, by the wireless access node, the signal of the second carrier according to the configuration information;
wherein when frequency division multiplexing or time division multiplexing cannot be performed, on an overlapping spectrum, between a fundamental channel of the first carrier and a fundamental channel of the second carrier, subframe start moments of the first carrier and the second carrier are offset for a specific time unit, so as to overlap a first fundamental channel of the first carrier and a second fundamental channel of the second carrier, wherein a transmit power of the second fundamental channel of the second carrier on the overlapping spectrum is reduced to be less than a preset threshold or to be 0, or a transmit power of the first fundamental channel of the first carrier on the overlapping spectrum is reduced to be less than a preset threshold or to be 0;
wherein both the fundamental channel of the second carrier and the fundamental channel of the first carrier comprise at least one of a common channel, a common control channel, a dedicated control channel, a shared channel, and a random access channel; and
wherein the first fundamental channel of the first carrier is one of fundamental channels of the first carrier, the second fundamental channel of the second carrier is one of fundamental channels of the second carrier, and the first fundamental channel and the second fundamental channel are channels of different types.

17. The method according to claim 11, wherein:
a guard band of the spectrum occupied by the first carrier and a guard band of the spectrum occupied by the second carrier overlaps; or
a guard band of the spectrum occupied by the first carrier and a fundamental channel of the second carrier overlaps; or
a guard band of the spectrum occupied by the second carrier and a fundamental channel of the first carrier overlaps.

18. The method according to claim 16, wherein when the second fundamental channel of the second carrier is a common pilot channel, the method further comprises:
sending, by the wireless access node, a demodulation reference signal by using the second carrier on a non-overlapping spectrum between the second carrier and the first carrier, wherein the demodulation reference signal is used for data demodulation of the non-overlapping spectrum of the second carrier.

19. The method according to claim 16, wherein when the fundamental channel of the first carrier and the fundamental channel of the second carrier are physical downlink control channels, the method further comprises:
sending, by the wireless access node, on a physical downlink control channel of the first carrier, downlink control information of a physical downlink control channel of the second carrier by using a cross-carrier scheduling technology; or
sending, on a physical downlink control channel of the second carrier, downlink control information of a physical downlink control channel of the first carrier.

20. The method according to claim 11, further comprising:
transmitting, by the wireless access node on a physical downlink control channel of a third carrier, downlink control information of the first carrier or the second carrier by using a cross-carrier scheduling technology, wherein:

the third carrier and the first carrier do not overlap, and the third carrier and the second carrier do not overlap; and the third carrier is a primary carrier, and both the first carrier and the second carrier are secondary carriers corresponding to the third carrier; or the third carrier is a primary carrier, the first carrier is a primary carrier, and the second carrier is a secondary carrier corresponding to the third carrier.

* * * * *